(12) United States Patent
Giannini et al.

(10) Patent No.: US 8,484,516 B2
(45) Date of Patent: Jul. 9, 2013

(54) INTER-THREAD TRACE ALIGNMENT METHOD AND SYSTEM FOR A MULTI-THREADED PROCESSOR

(75) Inventors: Louis Achille Giannini, Berwyn, IL (US); William Anderson, Austin, TX (US); Xufeng Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 492 days.

(21) Appl. No.: 11/734,199

(22) Filed: Apr. 11, 2007

(65) Prior Publication Data

US 2008/0256396 A1 Oct. 16, 2008

(51) Int. Cl.
*G06F 11/00* (2006.01)

(52) U.S. Cl.
USPC ............... 714/45; 714/12; 714/20; 717/128

(58) Field of Classification Search
USPC .................... 714/12, 20, 38, 45; 717/128
See application file for complete search history.

(56) References Cited

U.S. PATENT DOCUMENTS

| | | |
|---|---|---|
| 4,080,650 A | 3/1978 | Beckett |
| 4,669,059 A | 5/1987 | Little et al. |
| 4,901,307 A | 2/1990 | Gilhousen et al. |
| 5,093,914 A | 3/1992 | Coplien et al. |
| 5,103,459 A | 4/1992 | Gilhousen et al. |
| 5,136,717 A | 8/1992 | Morley et al. |
| 5,544,311 A | 8/1996 | Harenberg et al. |
| 5,551,043 A | 8/1996 | Crump et al. |
| 5,944,841 A * | 8/1999 | Christie ............ 714/38 |
| 5,951,696 A | 9/1999 | Naaseh et al. |
| 6,018,759 A | 1/2000 | Doing et al. |
| 6,029,248 A | 2/2000 | Clee et al. |

(Continued)

FOREIGN PATENT DOCUMENTS

| | | |
|---|---|---|
| EP | 1411434 A2 | 4/2004 |
| JP | 2183362 A | 7/1990 |

(Continued)

OTHER PUBLICATIONS

European Search Report—EP08005116, Search Authority—The Hague—Feb. 5, 2010.

(Continued)

*Primary Examiner* — Robert Beausoliel
*Assistant Examiner* — Joshua P Lottich
(74) *Attorney, Agent, or Firm* — Peter Michael Kamarchik; Nicholas J. Pauley; Joseph Agusta

(57) ABSTRACT

Techniques for the design and use of a digital signal processor, including (but not limited to) for processing transmissions in a communications (e.g., CDMA) system. Inter-thread trace alignment with execution trace processing includes recording timing data relating to a common predetermined event. Such an event may be the number of cycles since a last thread initiated execution tracing or the number of cycles since all threads terminated execution tracing. The number of cycles at which a thread initiates execution tracing is referenced to the common predetermined event for maintaining the timing of execution tracing. The data relating to the common predetermined event is then updated to associate with the time at which the thread initiated execution tracing. The result is to permit aligning the timing data associated with all threads. Interrelated records permit reconstructing inter-dependent execution tracing information for threads operating in the multi-threaded processor, as well as synchronizing timing data for all operating threads.

35 Claims, 12 Drawing Sheets

U.S. PATENT DOCUMENTS

| | | | |
|---|---|---|---|
| 6,052,708 A | 4/2000 | Flynn et al. | |
| 6,067,588 A * | 5/2000 | Ito | 710/28 |
| 6,106,571 A * | 8/2000 | Maxwell | 717/131 |
| 6,199,181 B1 | 3/2001 | Rechef et al. | |
| 6,202,172 B1 | 3/2001 | Ponte | |
| 6,212,544 B1 | 4/2001 | Borkenhagen et al. | |
| 6,226,749 B1 | 5/2001 | Carloganu et al. | |
| 6,249,907 B1 | 6/2001 | Carter et al. | |
| 6,314,530 B1 | 11/2001 | Mann | |
| 6,341,347 B1 | 1/2002 | Joy et al. | |
| 6,343,371 B1 * | 1/2002 | Flanagan et al. | 717/124 |
| 6,467,054 B1 | 10/2002 | Lenny | |
| 6,480,818 B1 | 11/2002 | Alverson et al. | |
| 6,532,553 B1 | 3/2003 | Gwilt et al. | |
| 6,567,839 B1 | 5/2003 | Borkenhagen et al. | |
| 6,665,802 B1 | 12/2003 | Ober | |
| 6,684,348 B1 | 1/2004 | Edwards et al. | |
| 6,697,935 B1 | 2/2004 | Borkenhagen et al. | |
| 6,708,270 B1 | 3/2004 | Mayer | |
| 6,714,958 B1 | 3/2004 | Tudor | |
| 6,757,829 B1 | 6/2004 | Laczko, Sr. et al. | |
| 6,798,713 B1 | 9/2004 | Yearsley et al. | |
| 6,832,334 B2 | 12/2004 | Wojcieszak et al. | |
| 6,834,360 B2 | 12/2004 | Corti et al. | |
| 6,915,416 B2 | 7/2005 | Deng et al. | |
| 6,981,261 B2 | 12/2005 | Kalafatis et al. | |
| 7,013,400 B2 | 3/2006 | Kalla et al. | |
| 7,020,871 B2 | 3/2006 | Bernstein et al. | |
| 7,047,451 B2 * | 5/2006 | Agarwala et al. | 714/45 |
| 7,055,139 B2 | 5/2006 | Balle et al. | |
| 7,073,059 B2 | 7/2006 | Worely, Jr. et al. | |
| 7,076,804 B2 | 7/2006 | Kershenbaum et al. | |
| 7,080,289 B2 * | 7/2006 | Swaine et al. | 714/45 |
| 7,093,236 B2 * | 8/2006 | Swaine et al. | 717/128 |
| 7,131,114 B2 | 10/2006 | Nguyen et al. | |
| 7,185,319 B2 | 2/2007 | Kaler et al. | |
| 7,203,926 B2 | 4/2007 | Bogle et al. | |
| 7,210,064 B2 | 4/2007 | Mayer | |
| 7,213,134 B2 | 5/2007 | Soltis, Jr. et al. | |
| 7,222,262 B2 | 5/2007 | Prasadh et al. | |
| 7,254,716 B1 | 8/2007 | Giles et al. | |
| 7,278,058 B1 * | 10/2007 | Narisi | 714/38 |
| 7,318,017 B2 * | 1/2008 | Swoboda | 703/28 |
| 7,321,957 B2 | 1/2008 | Khan et al. | |
| 7,360,117 B1 | 4/2008 | Boike et al. | |
| 7,369,954 B2 * | 5/2008 | Levine et al. | 702/79 |
| 7,370,210 B2 | 5/2008 | Symes | |
| 7,380,112 B2 | 5/2008 | Okabayashi et al. | |
| 7,380,276 B2 | 5/2008 | Saha et al. | |
| 7,383,537 B2 | 6/2008 | Darweesh et al. | |
| 7,383,540 B2 | 6/2008 | Kalra | |
| 7,421,571 B2 | 9/2008 | Shoemaker | |
| 7,437,619 B2 | 10/2008 | McCullough et al. | |
| 7,461,407 B2 | 12/2008 | Little et al. | |
| 7,472,378 B2 | 12/2008 | Bennett et al. | |
| 7,475,303 B1 | 1/2009 | Edgar et al. | |
| 7,512,954 B2 * | 3/2009 | Srivastava et al. | 719/318 |
| 7,577,878 B2 * | 8/2009 | Baradie et al. | 714/45 |
| 7,594,146 B2 * | 9/2009 | Horikawa et al. | 714/55 |
| 7,600,221 B1 * | 10/2009 | Rangachari | 717/128 |
| 7,657,791 B2 | 2/2010 | Codrescu et al. | |
| 7,657,875 B2 * | 2/2010 | Alexander et al. | 717/128 |
| 7,770,155 B2 * | 8/2010 | Bates et al. | 717/128 |
| 7,770,156 B2 | 8/2010 | Thekkath | |
| 7,823,131 B2 | 10/2010 | Gard et al. | |
| 7,890,316 B2 * | 2/2011 | Swoboda et al. | 703/23 |
| 7,917,907 B2 | 3/2011 | Ahmed et al. | |
| 8,136,097 B2 | 3/2012 | Konishi et al. | |
| 8,196,109 B2 | 6/2012 | Fung et al. | |
| 8,239,838 B2 | 8/2012 | Yim et al. | |
| 2001/0027538 A1 | 10/2001 | Wojcieszak et al. | |
| 2002/0004933 A1 | 1/2002 | Dzoba et al. | |
| 2002/0035721 A1 | 3/2002 | Swoboda | |
| 2002/0065646 A1 | 5/2002 | Waldie et al. | |
| 2002/0099977 A1 | 7/2002 | Wong | |
| 2003/0014643 A1 | 1/2003 | Asami et al. | |
| 2003/0037225 A1 | 2/2003 | Deng et al. | |
| 2003/0037226 A1 | 2/2003 | Tsuruta et al. | |
| 2003/0061550 A1 * | 3/2003 | Ng et al. | 714/45 |
| 2003/0065963 A1 * | 4/2003 | Gregg | 713/500 |
| 2003/0074650 A1 | 4/2003 | Akgul et al. | |
| 2003/0097615 A1 | 5/2003 | Corti et al. | |
| 2003/0135720 A1 | 7/2003 | DeWitt, Jr. et al. | |
| 2004/0024995 A1 * | 2/2004 | Swaine | 712/227 |
| 2004/0103397 A1 * | 5/2004 | Agarwala et al. | 717/128 |
| 2004/0103398 A1 * | 5/2004 | Agarwala et al. | 717/128 |
| 2004/0105298 A1 | 6/2004 | Symes | |
| 2004/0117768 A1 * | 6/2004 | Chang et al. | 717/125 |
| 2004/0123274 A1 | 6/2004 | Inagaki et al. | 717/128 |
| 2004/0133823 A1 * | 7/2004 | Swoboda et al. | 714/39 |
| 2004/0170046 A1 | 9/2004 | Belnet et al. | |
| 2004/0170168 A1 * | 9/2004 | Dedek | 370/389 |
| 2004/0177269 A1 | 9/2004 | Belnet et al. | |
| 2004/0205747 A1 | 10/2004 | Bernstein et al. | |
| 2004/0260910 A1 | 12/2004 | Watt et al. | |
| 2005/0034024 A1 | 2/2005 | Alverson et al. | |
| 2005/0034039 A1 | 2/2005 | Prasadh et al. | |
| 2005/0044534 A1 | 2/2005 | Darweesh et al. | |
| 2005/0091520 A1 | 4/2005 | Khan et al. | |
| 2005/0108689 A1 * | 5/2005 | Hooper et al. | 717/135 |
| 2005/0132338 A1 | 6/2005 | Kalra | |
| 2005/0177703 A1 * | 8/2005 | Norden et al. | 712/205 |
| 2005/0177819 A1 * | 8/2005 | Ober et al. | 717/128 |
| 2005/0188358 A1 | 8/2005 | Johnson et al. | |
| 2005/0193277 A1 * | 9/2005 | Horikawa et al. | 714/45 |
| 2005/0246691 A1 * | 11/2005 | Hsieh et al. | 717/129 |
| 2005/0268168 A1 | 12/2005 | Ishihara | |
| 2006/0026594 A1 | 2/2006 | Yoshida et al. | |
| 2006/0048099 A1 | 3/2006 | Templin et al. | |
| 2006/0069953 A1 | 3/2006 | Lippett et al. | |
| 2006/0129999 A1 * | 6/2006 | Hiraoka et al. | 717/128 |
| 2006/0179281 A1 | 8/2006 | Jensen et al. | |
| 2006/0184835 A1 * | 8/2006 | Al-Omari et al. | 714/45 |
| 2006/0206902 A1 | 9/2006 | Jamil et al. | |
| 2006/0212759 A1 * | 9/2006 | Campbell et al. | 714/38 |
| 2006/0242470 A1 | 10/2006 | McCullough et al. | |
| 2006/0248394 A1 | 11/2006 | McGowan | |
| 2006/0248395 A1 | 11/2006 | McGowan | |
| 2006/0248401 A1 * | 11/2006 | Carroll et al. | 714/38 |
| 2006/0253894 A1 | 11/2006 | Bookman et al. | |
| 2006/0259893 A1 * | 11/2006 | Sohm et al. | 714/45 |
| 2006/0279439 A1 | 12/2006 | Swoboda | |
| 2006/0282419 A1 * | 12/2006 | Sen et al. | 707/4 |
| 2006/0282734 A1 | 12/2006 | Milne et al. | |
| 2007/0016959 A1 | 1/2007 | Ikeda et al. | |
| 2007/0043861 A1 * | 2/2007 | Baron et al. | 709/224 |
| 2007/0089095 A1 * | 4/2007 | Thekkath et al. | 717/128 |
| 2007/0180333 A1 * | 8/2007 | Thekkath et al. | 714/45 |
| 2007/0180431 A1 * | 8/2007 | Agarwala et al. | 717/128 |
| 2007/0220360 A1 * | 9/2007 | Weinert et al. | 714/45 |
| 2007/0234306 A1 * | 10/2007 | Klinger et al. | 717/128 |
| 2007/0240125 A1 | 10/2007 | Degenhardt et al. | |
| 2007/0271461 A1 | 11/2007 | Hardy et al. | |
| 2007/0288906 A1 * | 12/2007 | Agarwala et al. | 717/128 |
| 2008/0010640 A1 * | 1/2008 | Foo | 718/100 |
| 2008/0027961 A1 * | 1/2008 | Arlitt et al. | 707/101 |
| 2008/0028196 A1 * | 1/2008 | Kailas | 712/245 |
| 2008/0034350 A1 | 2/2008 | Conti | |
| 2008/0052681 A1 * | 2/2008 | Yang | 717/128 |
| 2008/0059963 A1 * | 3/2008 | Foo | 718/100 |
| 2008/0080651 A1 * | 4/2008 | Edgar | 375/356 |
| 2008/0098207 A1 * | 4/2008 | Reid et al. | 712/227 |
| 2008/0114972 A1 | 5/2008 | Codrescu et al. | |
| 2008/0115011 A1 | 5/2008 | Codrescu et al. | |
| 2008/0115113 A1 | 5/2008 | Codrescu et al. | |
| 2008/0115115 A1 | 5/2008 | Codrescu et al. | |
| 2008/0209176 A1 * | 8/2008 | Singh et al. | 712/214 |
| 2008/0256339 A1 * | 10/2008 | Xu et al. | 712/216 |
| 2008/0288808 A1 | 11/2008 | Moyer | |
| 2009/0007076 A1 * | 1/2009 | Al-Omari et al. | 717/128 |
| 2009/0132863 A1 * | 5/2009 | Ashfield et al. | 714/45 |
| 2009/0199162 A1 * | 8/2009 | Choi et al. | 717/124 |

FOREIGN PATENT DOCUMENTS

| | | |
|---|---|---|
| JP | 04145544 | 5/1992 |
| JP | 8055023 A | 2/1996 |
| JP | 8087366 A | 4/1996 |

| | | | |
|---|---|---|---|
| JP | 9167105 A | 6/1997 | |
| JP | 2001154873 A | 6/2001 | |
| JP | 2001519947 A | 10/2001 | |
| JP | 2001331340 A | 11/2001 | |
| JP | 2001521215 T | 11/2001 | |
| JP | 2003177938 A | 6/2003 | |
| JP | 2004171563 A | 6/2004 | |
| JP | 2004171564 A | 6/2004 | |
| JP | 2006285430 A | 10/2006 | |
| KR | 20010031167 | 4/2001 | |
| KR | 20060049710 | 5/2006 | |
| TW | 200402959 | 2/2004 | |
| TW | I226757 B | 1/2005 | |
| TW | I228929 B | 3/2005 | |
| TW | 200625070 | 7/2006 | |
| WO | WO9921089 | 4/1999 | |
| WO | WO0068780 | 11/2000 | |
| WO | WO0118651 A1 | 3/2001 | |
| WO | WO2006030195 A2 | 3/2006 | |

OTHER PUBLICATIONS

International Search Report and Written Opinion—PCT/US08/60117—International Search Authority, European Patent Office—Feb. 2, 2010.
"Processor-Controlled Battery Back-Up Power Supply Architecture" IBM Technical Disclosure Bulletin, IBM Corp. New York, US, Vol. 31, No. 3, (Aug. 1, 1988), pp. 183-185, XP000119002, ISSN: 0018-8689.
"Technique for Power Management in Signal Processors" IBM Technical Disclosure Bulletin, IBM Corp. New York, US, vol. 35, No. 5, (Oct. 1, 1992), pp. 425-427, XP000313036.
Hartvigsen, J. et al., "JTAG/Debug Interface"; Motorola Technical Developments, Motorola Inc., Schaumburg, Illinois, US; vol. 19, Jun. 1, 1993; pp. 107-109.
Wu C E et al: "Trace-based analysis and 1-35 tuning for distributed parallel applications" Parallel and Distributed Systems, 1994. International Conference On Hsinchu, Taiwan Dec. 19-21, 1994, Los Alamitos, CA, USA, IEEE Comput. Soc, Dec. 19, 1994, pp. 716-723, XPOI0223604 ISBN: 978-0-8186-6555-4 * the whole document *.
Yang Gian et al: "Cycle accurate thread 1-35 timer for linux environment" Performance Analysis Of Systems And Software, 2001. ISPASS. 2001 IEEE International Symposium On Nov. 4-6, 2001, Piscataway, NJ, USA, IEEE, Nov. 4, 2001, pp. 38-44, XPOI0583886 ISBN: 978-0-7695-7230-7 * abstract * p. 40, left-hand column, line 5-line *13 * p. 42, left-hand column, line 10-line 23 *.

"Universal Mobile Telecommunications Systems (UMTS)" ETSI Standards, European Telecommunications Standard Institute, Sophia-Antipo, FR, vol. 3-R2, No. V610, Jun. 2001, XP014016761.
Microsoft Press Computer Dictionary, Third Edition, "operating system," Microsoft Press (Aug. 1, 1997), ISBN 1-57231-446-X, p. 341.
Translation of Office Action in Korean Application 10-2009-7023540 corresponding to U.S. Appl. No. 11/734,199, citing WO06030195 and KR20060049710 dated Feb. 17, 2011.
Jiang, "Enhancing System-on-Chip Verification Using Embedded Test Structures", Dec. 2005, pp. 1-61.
Vermeulen et al., "Core-Based Scan Architecture for Silicon Debug", IEEE, 2002, pp. 638-647.
ARM Limited, Embedded Trace Macrocell 9—Technical Reference Manual, 2002, 164 pages, <http://rtds.cs.tamu.edu/web_462/techdocs/ARM/debug/DDI0157F_ETM9_r2p2.pdf>.
Blair Fort, et al., "A Multithreaded Soft Processor for SOPC Area Reduction", IEEE International Symposium on Custom Computing Machines, Napa, CA, Oct. 2006, IEEE computer society, pp. 131-142.
Kreuzinger J, et al: "Context-Switching Techniques for Decoupled Multithreaded Processors" Euromicroconference, 1999, Proceedings. 25th Milan, Italy Sep. 8-10, 1999, Los Alamitos, CA, USA, IEEE Comput, Soc, US, vol. 1, (Sep. 8, 1999), pp. 248-251.
Ungerer Theo, "A Survey of Processors With Explicit Multithreading ,March 2003 (29-63),", ACM Computing Survey, 2003, 35 (1).
Andrews et al, "Xbox 360 system Architecture", 2006.
Rootselaar et al., "Debugging of system-on-a-chip", 1997.
Vermeulen et al., "Silicon Debug of a Co-processor Array for Video Applications", 2000.
Compan et al., GENVIEW: A Portable Source-Level Debugger For Macrocell Generators, 1991, 5 pages, <http://ieeexplore.ieee.org/stamp/stamp.jsp?tp=&arnumber=206436&userType=inst.>.
Mayer et al., Debug support, Clibration and Emulation for Multiple Processor and Powertrain Control SoCs, 2005, 5 pages, <http://ieeexplore.ieee.org/stamp/stamp.jps?arnumber=01395811>.
Camera et al.,"An integrated debugging environment for reprogrammable hardware systems", Sep. 2005, pp. 111-115, <http://delivery.acm.org/1 0.1145/1090000/1085145/p111-camera.pdf>.
Vermeulen et al.,"Automatic generation of breakpoint hardware for silicon debug", Jun. 2004, pp. 514-517, <http://delivery.acm.org/1 0.1145/1 000000/996708/p514-vermeulen.pdf>.

* cited by examiner

FIG. 10

| ATOM | DEFINITION (IF NOT DUAL JUMP) | DEFINITION (IF DUAL JUMP) |
|---|---|---|
| W | STALL CYCLE | STALL CYCLE |
| E | INSTRUCTION EXECUTED. CONDITIONAL JUMP TAKEN | FIRST JUMP TAKEN |
| N | CONDITIONAL JUMP FALSE. LOOPEND FALLTHROUGH | BOTH JUMPS NOT TAKEN |
| S |  | SECOND JUMP TAKEN. |

| | | | |
|---|---|---|---|
| byte 0 | 1 | PC[5:1] | T | 1 |
| byte 1 | 1 | PC[12:6] | | |
| byte 2 | 1 | PC[19:13] | | |
| byte 3 | 1 | PC[26:20] | | |
| byte 4 | 1 | 0 0 | PC[31:27] | |
| byte 5 | TID[7:0] | | | |
| byte 6 | TID[15:8] | | | |
| byte 7 | TID[23:16] | | | |
| byte 8 | TID[31:24] | | | |
| byte 9 | 1 0 | ASID[5:0] | | |
| byte 10 | TYPE[7:0] | | | |

280

T : TYPE-FIELD PRESENT FLAG

T: TID/ASID PRESENT FLAG
F: OFFSET FIELD PRESENT
V: OFFSET FIELD LENGTH
 (1 OR 2 bytes)

INTER-THREAD TRACE ALIGNMENT METHOD AND SYSTEM FOR A MULTI-THREADED PROCESSOR

RELATED APPLICATIONS

This application is related to the following co-pending United States patent application numbers: application Ser. No. 11/560,217, filed Nov. 15, 2006, entitled NON-INTRUSIVE, THREAD-SELECTIVE, DEBUGGING METHOD AND SYSTEM FOR A MULTI-THREAD DIGITAL SIGNAL PROCESSOR; application Ser. No. 11/560,323, filed Nov. 15, 2006, entitled METHOD AND SYSTEM FOR A DIGITAL SIGNAL PROCESSOR DEBUGGING DURING POWER TRANSITIONS; application Ser. No. 11/560,332, filed Nov. 15, 2006, entitled METHOD AND SYSTEM FOR TRUSTED/UNTRUSTED DIGITAL SIGNAL PROCESSOR DEBUGGING OPERATIONS; application Ser. No. 11/560,339, filed Nov. 15, 2006, entitled EMBEDDED TRACE MACROCELL FOR ENHANCED DIGITAL SIGNAL PROCESSOR DEBUGGING OPERATIONS; and application Ser. No. 11/560,344, filed Nov. 15, 2006, entitled METHOD AND SYSTEM FOR INSTRUCTION STUFFING OPERATIONS DURING NON-INTRUSIVE DIGITAL SIGNAL PROCESSOR DEBUGGING.

FIELD

The disclosed subject matter relates to data processing systems and processes such as may find use in data communications and similar applications. More particularly, this disclosure relates to a novel and improved method and system for digital signal processing debugging operations, including providing an inter-thread trace alignment method and system for an multi-threaded processor.

DESCRIPTION OF THE RELATED ART

Increasingly, telecommunications and other types of electronic equipment and supporting video, complex audio, videoconferencing and other rich software applications involve signal processing. Signal processing requires fast mathematical calculations and data generation in complex, but repetitive algorithms. Many applications require computations in real-time, i.e., the signal is a continuous function of time, which must be sampled and converted to digital signals for numerical processing. The processor must execute algorithms performing discrete computations on the samples as they arrive.

The architecture of a digital signal processor (DSP) is optimized to handle such algorithms. The characteristics of a good signal processing engine include fast, flexible arithmetic computation units, unconstrained data flow to and from the computation units, extended precision and dynamic range in the computation units, dual address generators, efficient program sequencing, and ease of programming.

One promising application of DSP technology includes communications systems such as a code division multiple access (CDMA) system that supports voice and data communications, as well as text messaging and other applications, between users over a satellite or terrestrial link. The use of CDMA techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS," and U.S. Pat. No. 5,103,459 entitled "SYSTEM AND METHOD FOR GENERATING WAVEFORMS IN A CDMA CELLULAR TELEHANDSET SYSTEM," both assigned to the assignee of the claimed subject matter.

A CDMA system is typically designed to conform to one or more standards. One such first generation standard is the "TIA/EIA/IS-95 Terminal-Base Station Compatibility Standard for Dual-Mode Wideband Spread Spectrum Cellular System," hereinafter referred to as the IS-95 standard. The IS-95 CDMA systems are able to transmit voice data and packet data. A newer generation standard that may more efficiently transmit packet data is offered by a consortium named the "$3^{rd}$ Generation Partnership Project" (3GPP) and embodied in a set of documents including Document Nos. 3G TS 25.211, 3G TS 25.212, 3G TS 25.213, and 3G TS 25.214, which are readily available to the public. The 3GPP standard is hereinafter referred to as the W-CDMA Standard.

Complex DSP operational software employing the W-DCMA Standard, for example, requires robust development tools. Such development tools may include those for code generation, integration, testing, debugging, and evaluating application performance. In developing and operating software or complex DSP applications, such as advanced telecommunications applications, there is the need for sophisticated, yet non-intrusive debugging software. That is, debugging software applications must be not only sufficiently robust to monitor, test, and support the correction of software defects and operational problems. At the same time, debugging software may need to operate so as not to interfere with the core processor software operations during concurrent debugging operations. Otherwise, any problems in the core processing software may not be detected or detected properly during software debugging operations.

During debugging operations, there is a need for associating with the non-intrusive software debugging operations tracing functions for tracing the operations of the processing of the operating threads within the DSP. Such a system may provide information on the DSP's state parameters for capturing such information both before and after a specific event occurs. At the same time, the desired tracing functions cannot add any significant burden to processor performance, even while the DSP operates at full speed. In combination with a non-intrusive debugging operation, such a tracing process may capture specific types of information. The tracing functions, therefore, provide for monitoring and recording in conjunction with non-intrusive debugging operations in a multi-threaded processor.

One particularly useful set of information a tracing function may provide includes inter-thread execution behavior. That is, a need exists for a set of tracing functions capable of inter-relating tracing data among different threads of a multi-threaded DSP. No known system provides such information. In debugging software operations, the user may desire to choose an arbitrary point in time at which to know which instructions a multi-threaded processor may be executing at a particular point in time. This information may be particularly valuable in the instance that different threads activate different per-thread debugging operations at different times.

In an interleaved multi-threaded DSP, the execution of multiple instruction sequences may occur concurrently. As such, the processor may be viewed as several single-threaded processors operating independently. Once such processor may include an execution tracing unit that records the runtime execution sequence of each of the operating threads. These traces facilitate program debugging operation by breaking down the program flow into a sequence of packets. In such a system, thread number fields may be added to certain packets to identify which packet belongs to which thread. With such an approach, each packet sequence for a particular thread may recreate the full execution sequence including all program flow changes and all instruction timing.

While identifying which packets belong to which thread is advantageous, no known tracing function provides the ability to identify inter-thread timing relationships during execution tracing. For instance, time differences between trace activation may be very large from one thread to another. When thread tracing begins on different threads sat different times, it may not be possible to align one thread's timing with other threads that are also being traced.

Accordingly, there is a need for a set of tracing functions capable of operating within a non-intrusive debugging process that establishes and maintains timing relationship between different DSP threads.

Yet a further need exists for a method and system that permits the alignment of different threads of a multi-threaded processor for use in association with an embedded trace macrocell process of the multi-threaded processor.

Still further, a need exists for an inter-thread trace alignment method and system for an interleaved multi-threaded processor capable of operating in association with a broad array of non-intrusive in-silicon debugging processes occurring during core processor software operations.

SUMMARY

Techniques for providing inter-thread trace alignment in an multi-threaded processor are disclosed, which techniques cooperate with an embedded trace macrocell for identifying inter-thread timing relationships and, therefore, to establish and maintain various timing relationships between different threads. The method and system here disclosed improve both the operation of a digital signal processor and the efficient use of digital signal processor instructions for increasingly powerful software applications, including applications operating in personal computers, personal digital assistants, wireless handsets, and similar electronic devices, as well as increasing the associated digital processor speed and service quality.

According to one aspect of the disclosed subject matter, a method and system are provided for inter-thread trace alignment with execution trace processing which includes recording timing data relating to a common predetermined event. Such a common predetermined event may be the number of cycles since a last thread initiated execution tracing or the number of cycles since all threads terminated execution tracing. The number of cycles at which a thread initiates execution tracing is referenced to the common predetermined event for maintaining the timing of execution tracing. The data relating to the common predetermined event is then updated to associate with the time at which the thread initiated execution tracing. The result is to permit aligning the timing data associated with all threads. Interrelated records permit reconstructing interdependent execution tracing information for threads operating in the multi-threaded processor, as well as synchronizing timing data for all operating threads.

These and other advantages of the disclosed subject matter, as well as additional novel features, will be apparent from the description provided herein. The intent of this summary is not to be a comprehensive description of the claimed subject matter, but rather to provide a short overview of some of the subject matter's functionality. Other systems, methods, features and advantages here provided will become apparent to one with skill in the art upon examination of the following FIGUREs and detailed description. It is intended that all such additional systems, methods, features and advantages be included within this description, be within the scope of the accompanying claims.

BRIEF DESCRIPTIONS OF THE DRAWINGS

The features, nature, and advantages of the disclosed subject matter may become more apparent from the detailed description set forth below when taken in conjunction with the drawings in which like reference characters identify correspondingly throughout and wherein.

Figure 3:
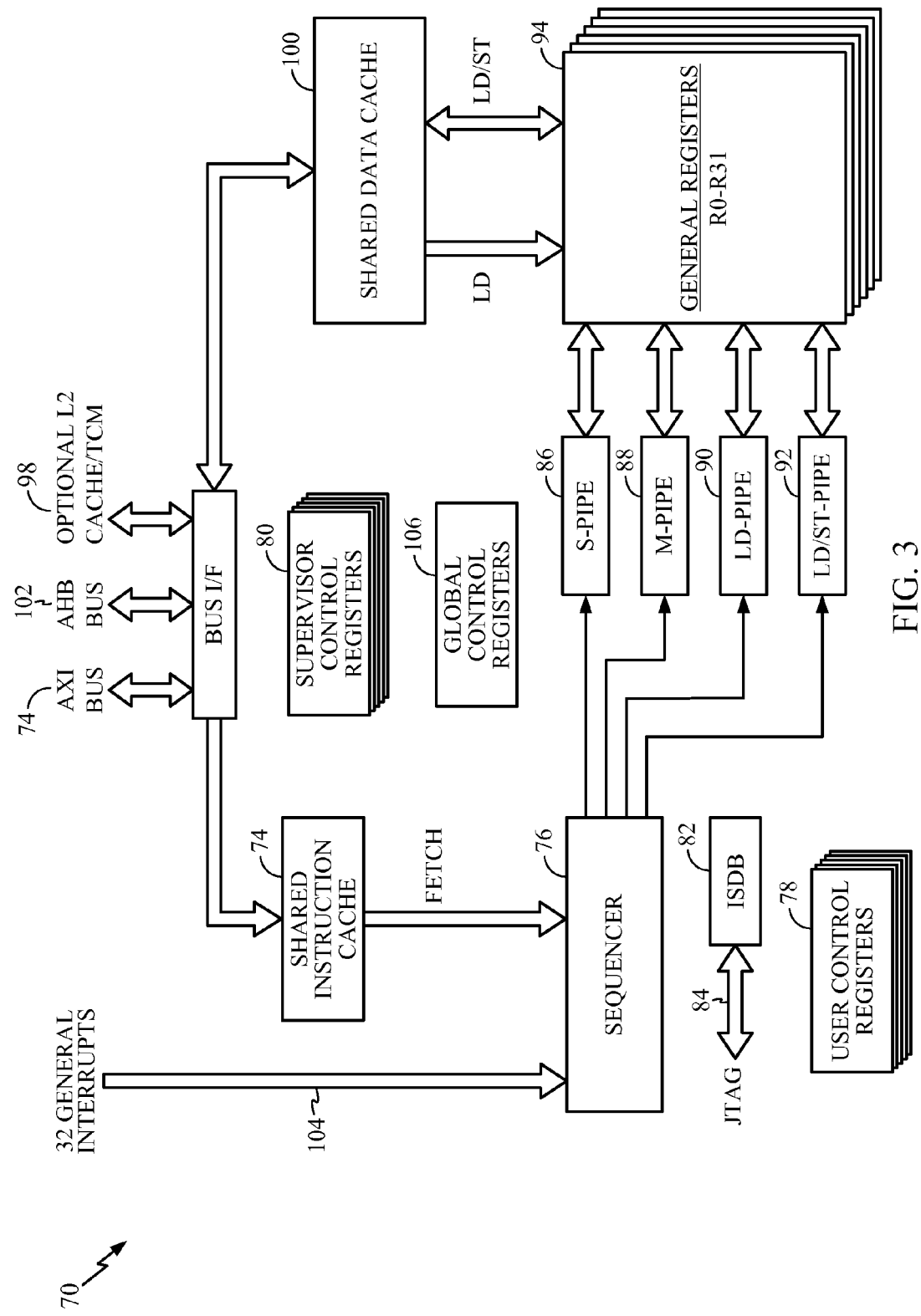
Figure 4:
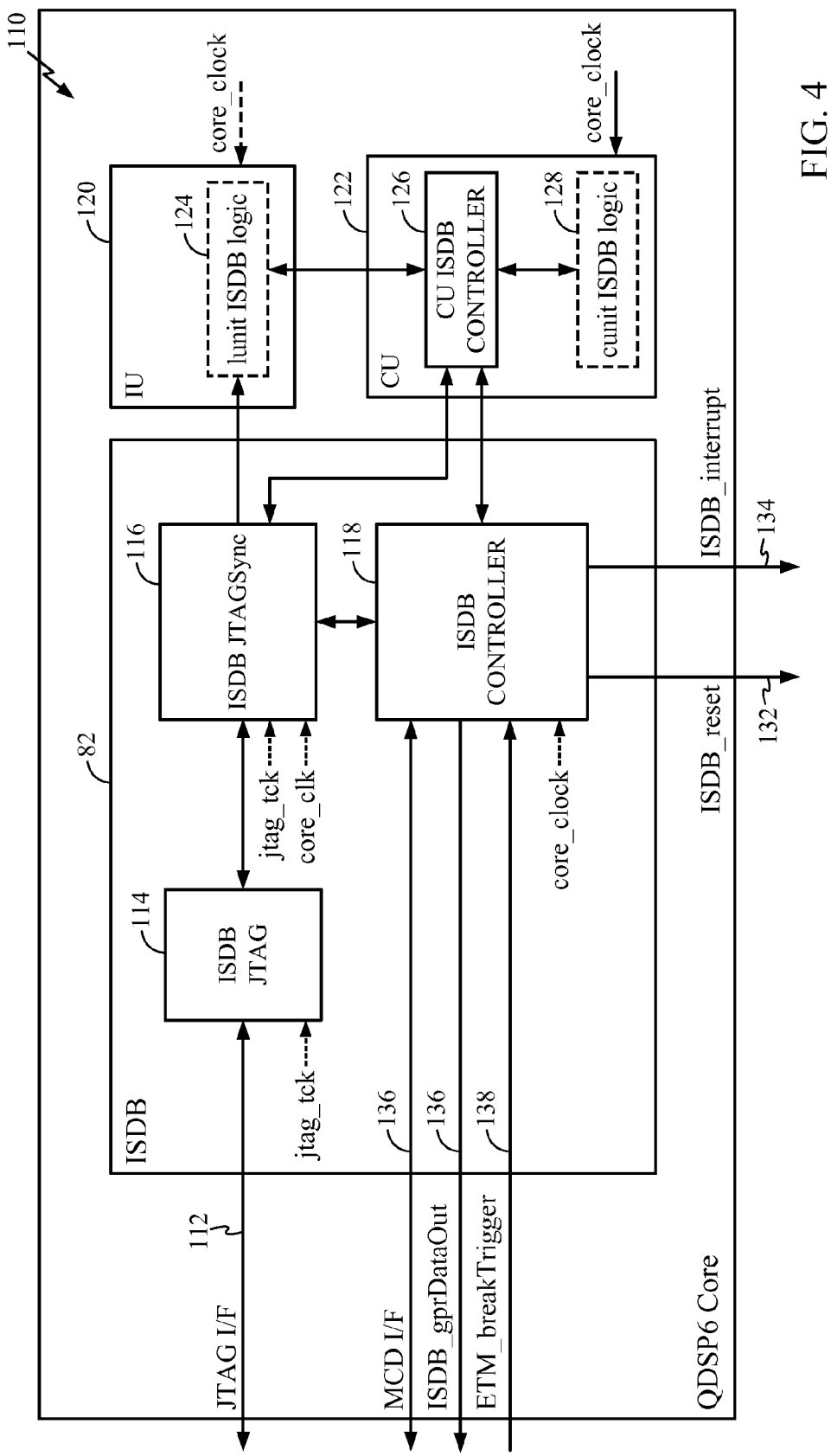
Figure 5:
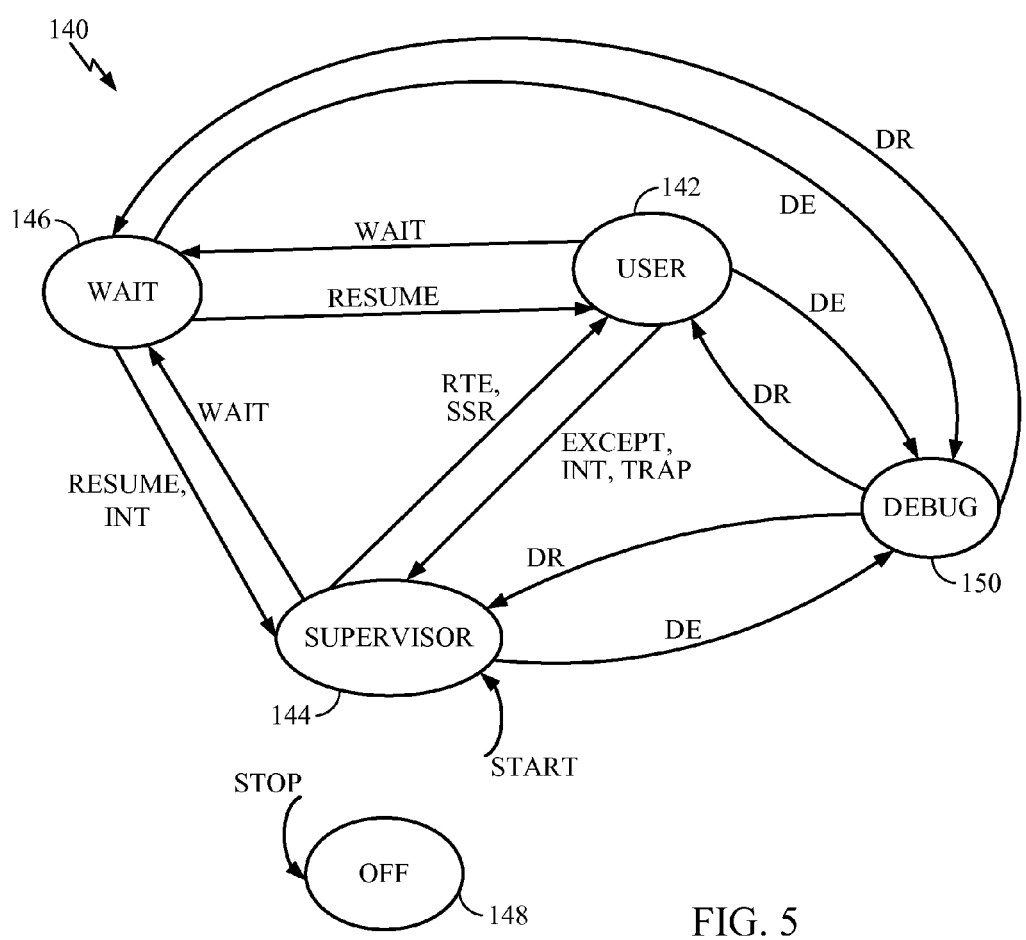
Figure 6:
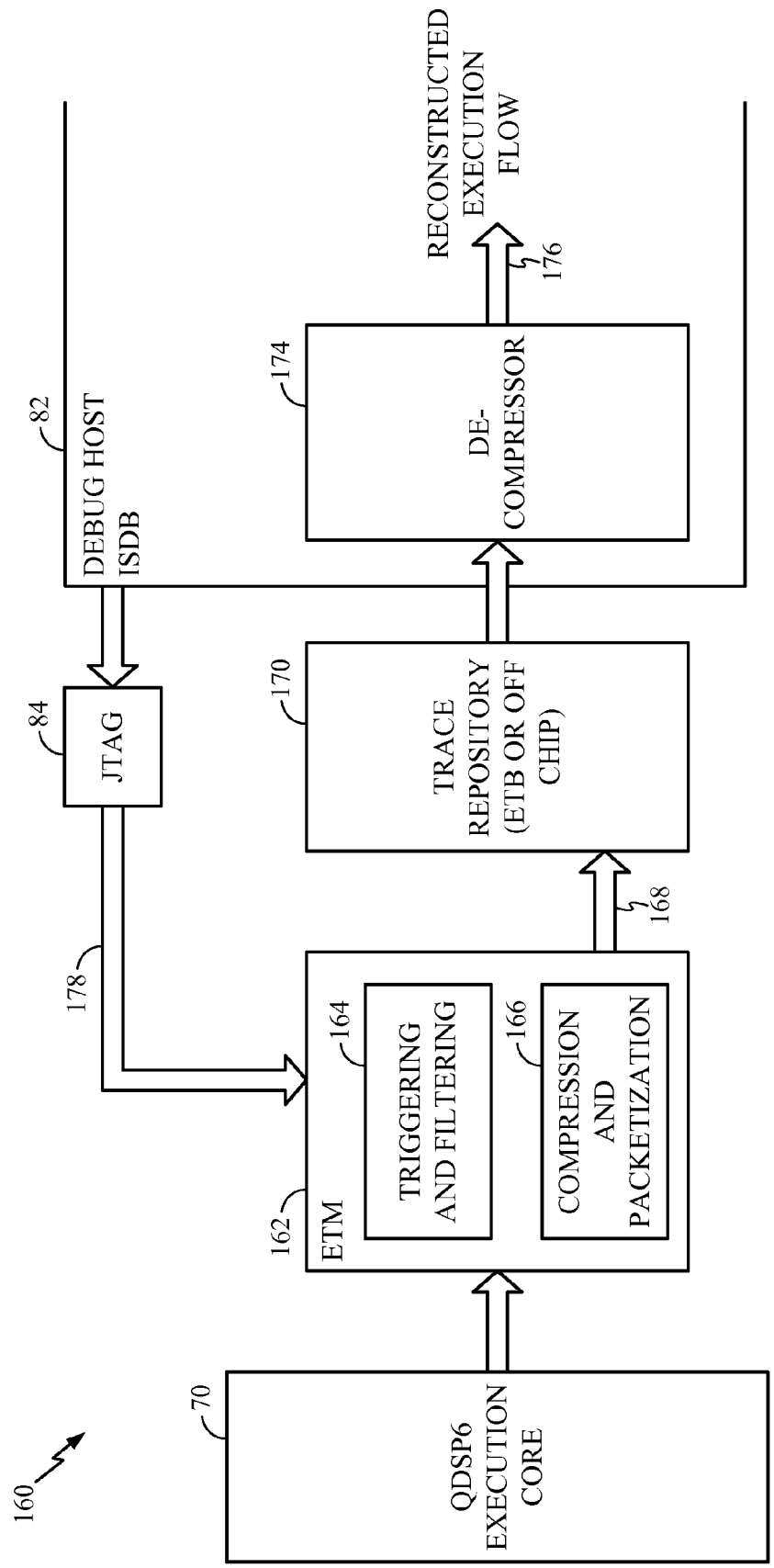
Figure 7:
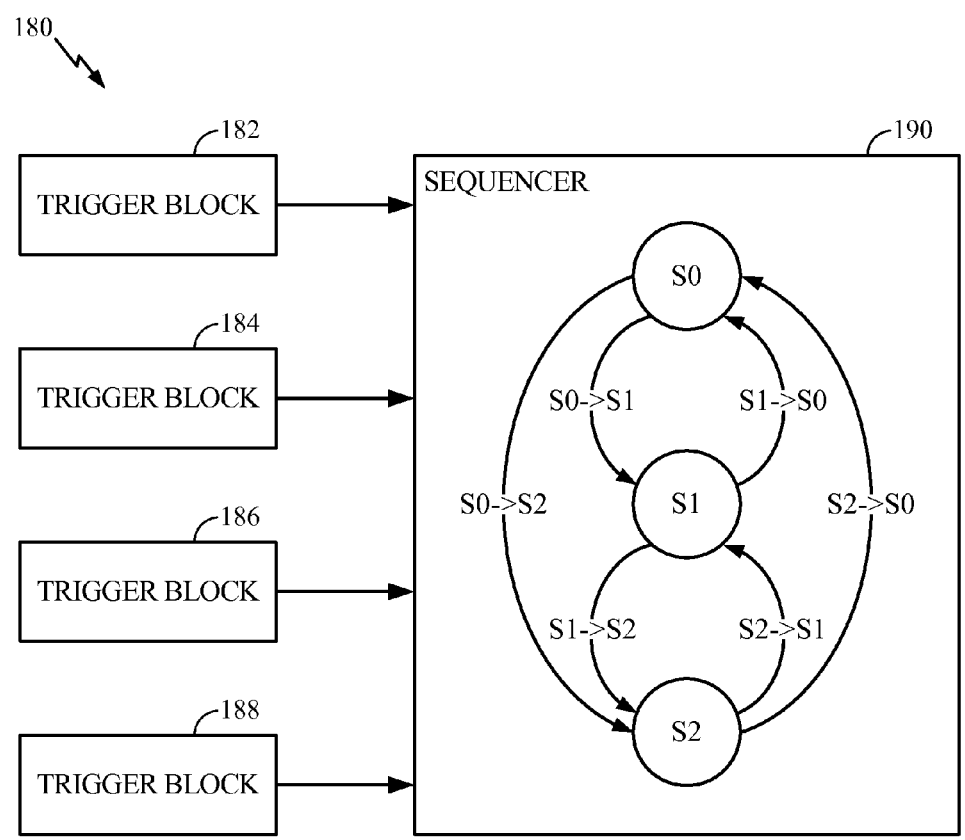
Figure 8:
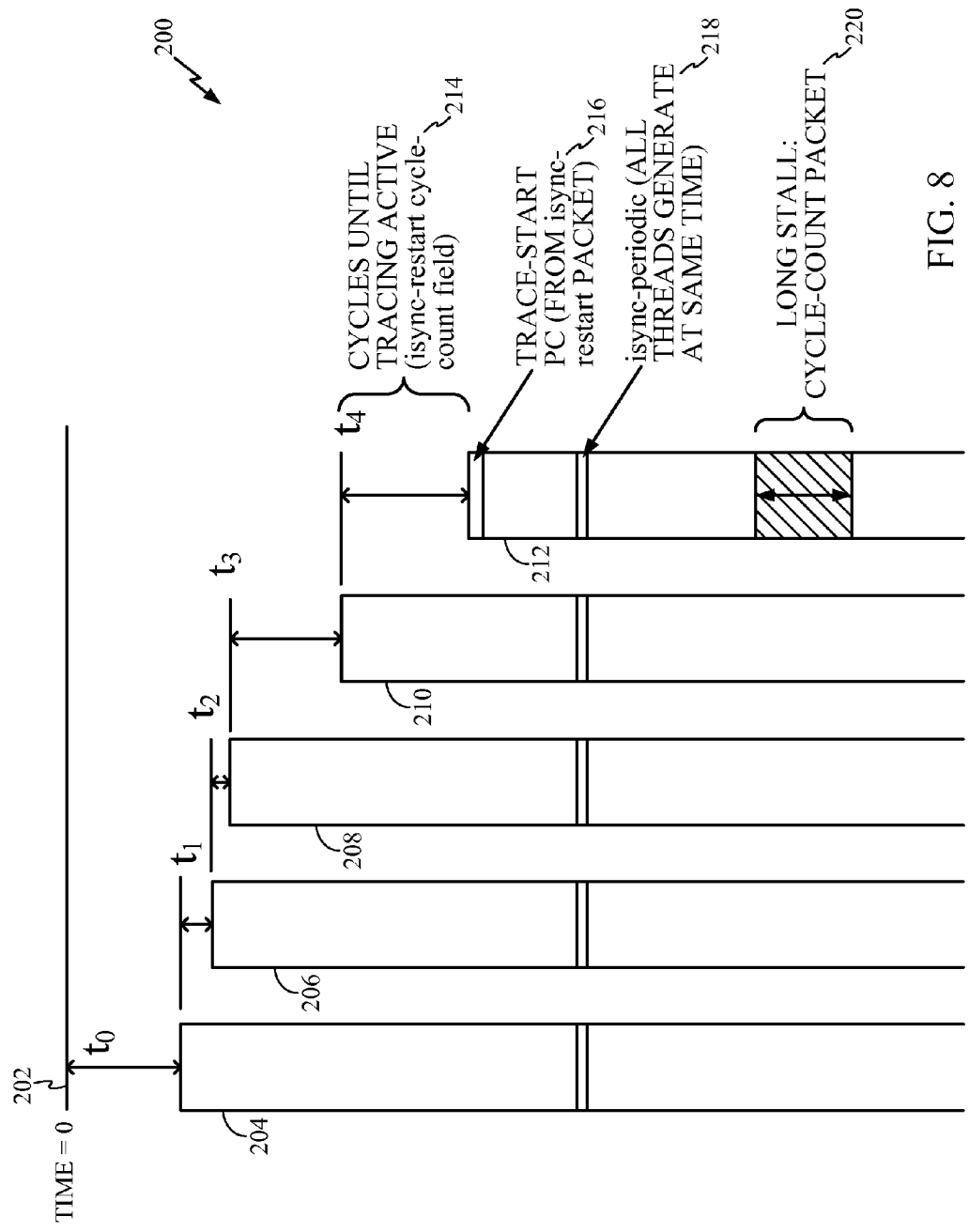
Figure 9:
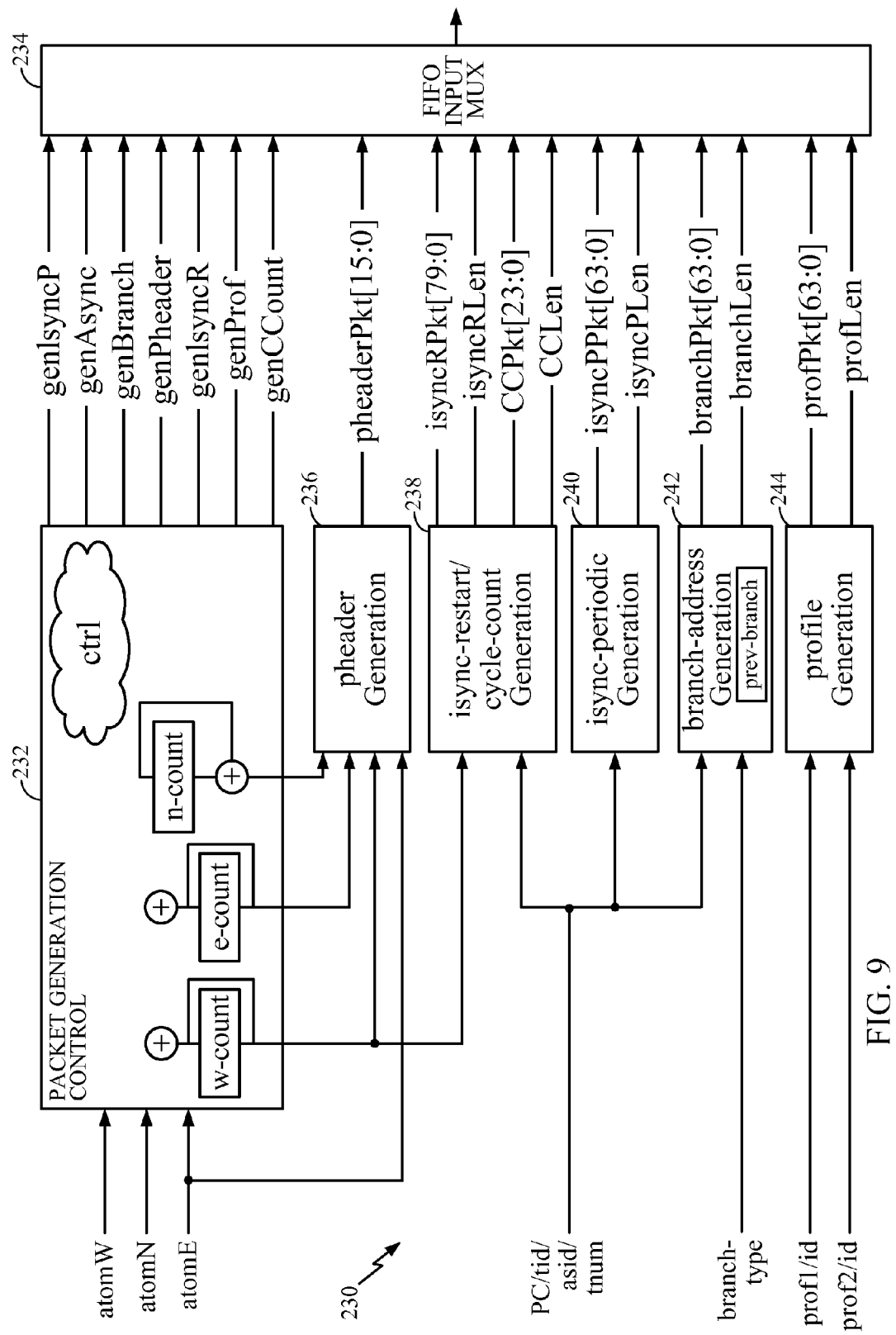
Figure 12:
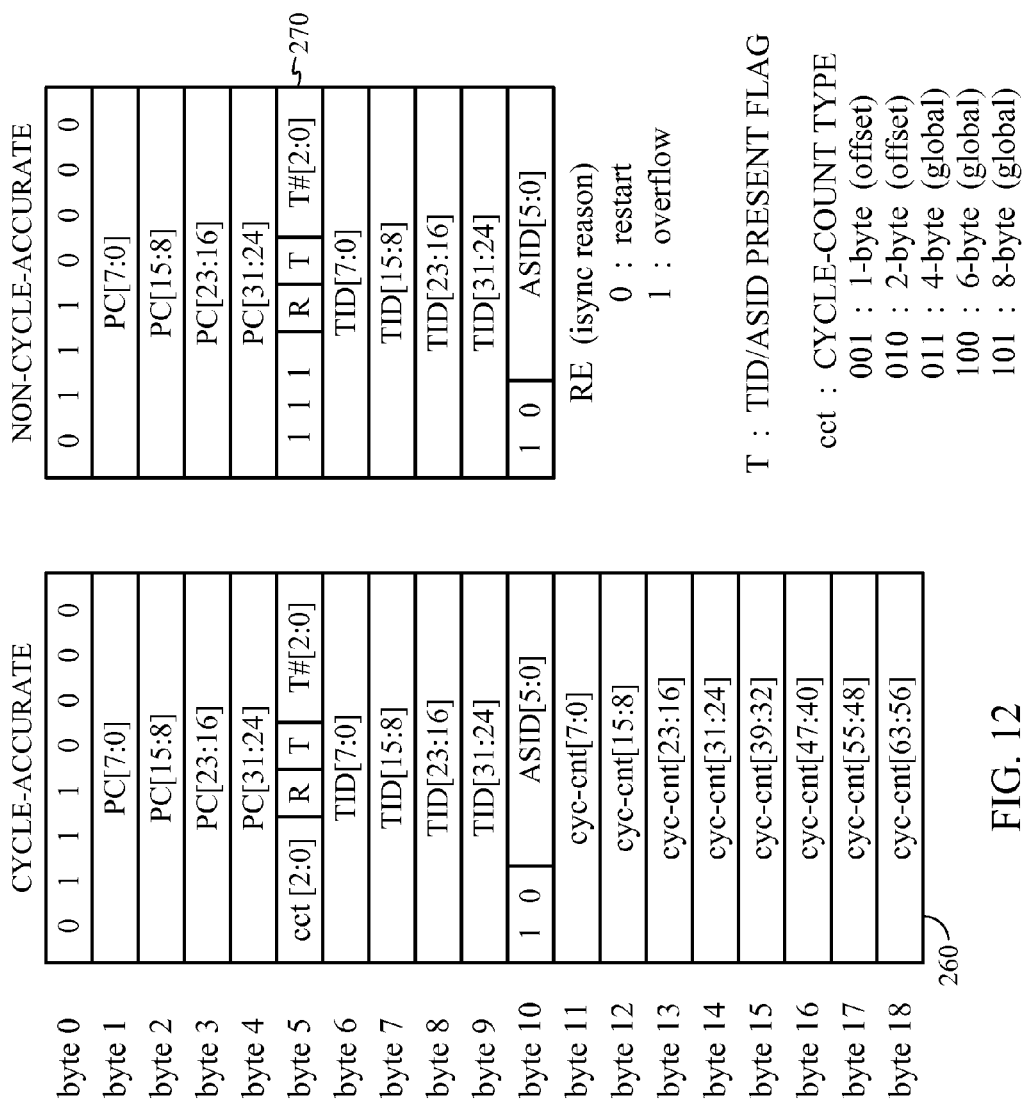
Figure 13:
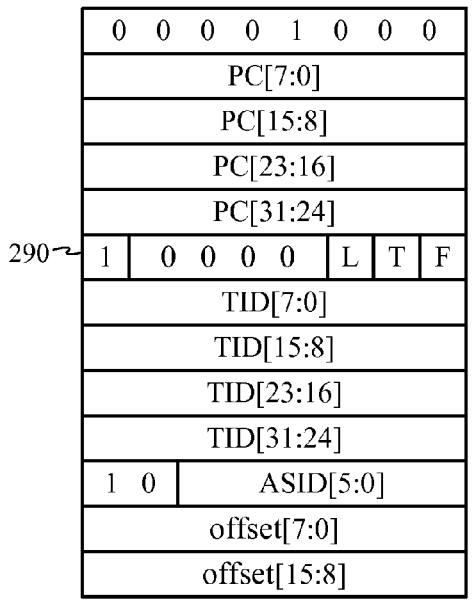
Figure 16:
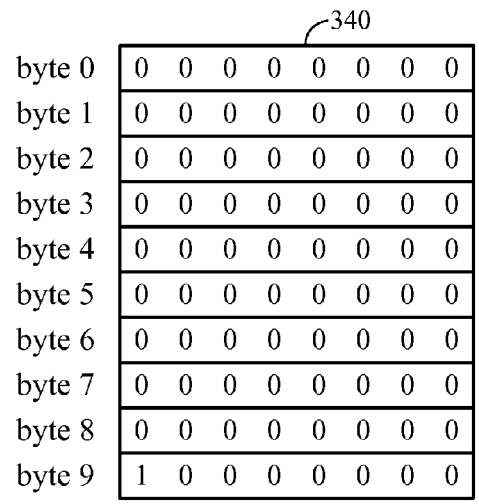
Figure 14:
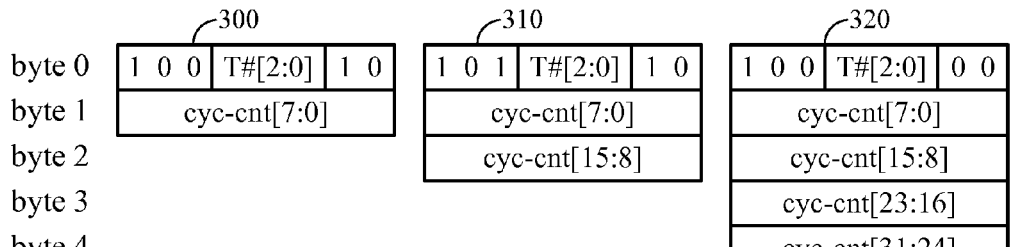
Figure 15:
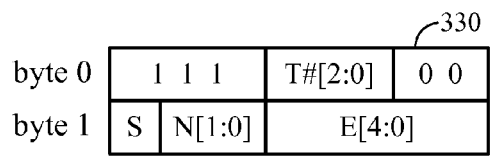

FIG. 3 provides an architecture block diagram of one embodiment of a multi-threaded digital signal processor incorporating the technical advantages of the presently disclosed subject matter;

FIG. 4 discloses certain aspects of a digital signal processor core applying the ISDB/JTAG interface features of the present disclosure;

FIG. 5 presents a process flow diagram applicable to the operating modes of the digital signal processor, including the debugging mode of operation to which the present disclosure pertains;

FIG. 6 provides block diagram depicting an overall functional view of the embedded trace macrocell of the present disclosure;

FIG. 7 shows a trigger block circuit of the disclosed embedded trace macrocell process and system;

FIG. 8 illustrates important concepts of the presently disclosed inter-thread trace alignment process;

FIG. 9 shows a functional overview of the packet generation unit as applicable in the disclosed subject matter;

FIG. 10 shows a table of definitions for the various atoms applicable to the instructions of the presently disclosed subject matter;

FIG. 11 provides a branch-address packet for the present disclosure that supports a 32-bit TID field as useful in the present disclosure;

FIG. 12 present exemplary contents of an isync-restart packet for use in the presently disclosed process;

FIG. 13 depicts an embodiment of an isync-periodic packet for supporting the presently disclosed subject matter;

FIG. 14 presents a cycle count packet for use in the presently disclosed process;

FIG. 15 shows one embodiment of a pheader format4 packet as relevant to the present disclosure; and FIG. 16 depicts an async packet for use with an embodiment of the disclosed subject matter.

DETAILED DESCRIPTION OF THE SPECIFIC EMBODIMENTS

Figure 1:
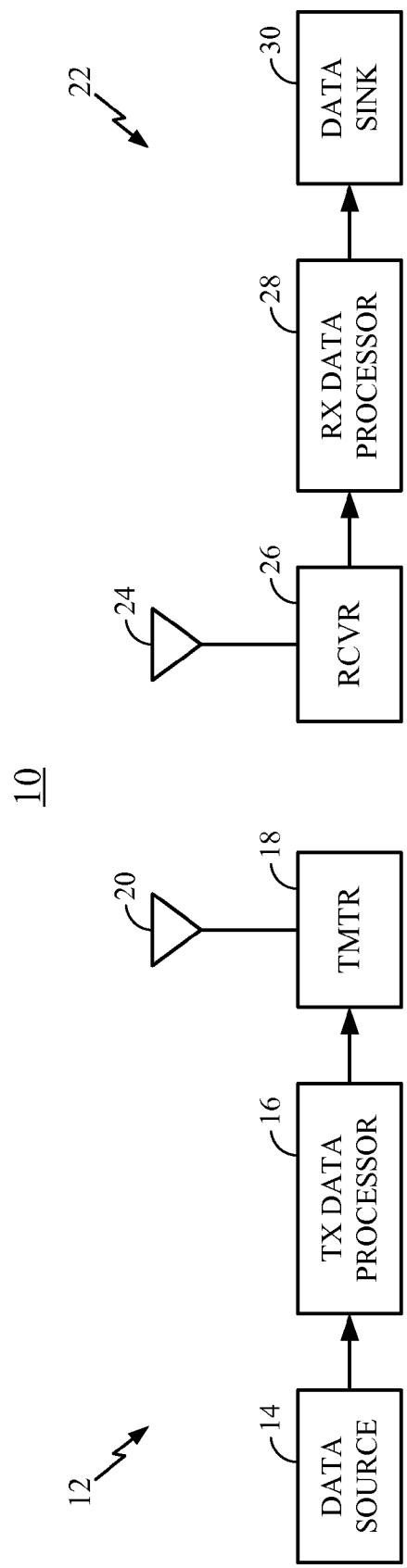
FIG. 1 is a simplified block diagram of a communications system that may implement one of the various embodiments here disclosed.

The disclosed subject matter for a inter-thread trace alignment method and system for use in association with execution trace processes of a multi-threaded digital signal processor has application for multi-threaded processing of any type for which the benefits here presented may be advantageous. One such application appears in telecommunications and, in particular, in wireless handsets that employ one or more digital signal processing circuits. For explaining how such a wireless handset may be used, FIG. 1 provides a simplified block diagram of a communications system 10 that may implement the presented embodiments of the disclosed interrupt processing method and system. At a transmitter unit 12, data is sent, typically in blocks, from a data source 14 to a transmit (TX) data processor 16 that formats, codes, and processes the data to generate one or more analog signals. The analog signals are then provided to a transmitter (TMTR) 18 that modulates, filters, amplifies, and up converts the baseband signals to generate a modulated signal. The modulated signal is then transmitted via an antenna 20 to one or more receiver units.

At a receiver unit 22, the transmitted signal is received by an antenna 24 and provided to a receiver (RCVR) 26. Within receiver 26, the received signal is amplified, filtered, down converted, demodulated, and digitized to generate in phase (I) and (Q) samples. The samples are then decoded and processed by a receive (RX) data processor 28 to recover the transmitted data. The decoding and processing at receiver unit 22 are performed in a manner complementary to the coding and processing performed at transmitter unit 12. The recovered data is then provided to a data sink 30.

The signal processing described above supports transmissions of voice, video, packet data, messaging, and other types of communication in one direction. A bi-directional communications system supports two-way data transmission. However, the signal processing for the other direction is not shown in FIG. 1 for simplicity. Communications system 10 may be a code division multiple access (CDMA) system, a time division multiple access (TDMA) communications system (e.g., a GSM system), a frequency division multiple access (FDMA) communications system, or other multiple access communications system that supports voice and data communication between users over a terrestrial link. In a specific embodiment, communications system 10 is a CDMA system that conforms to the W-CDMA Standard.

Figure 2:
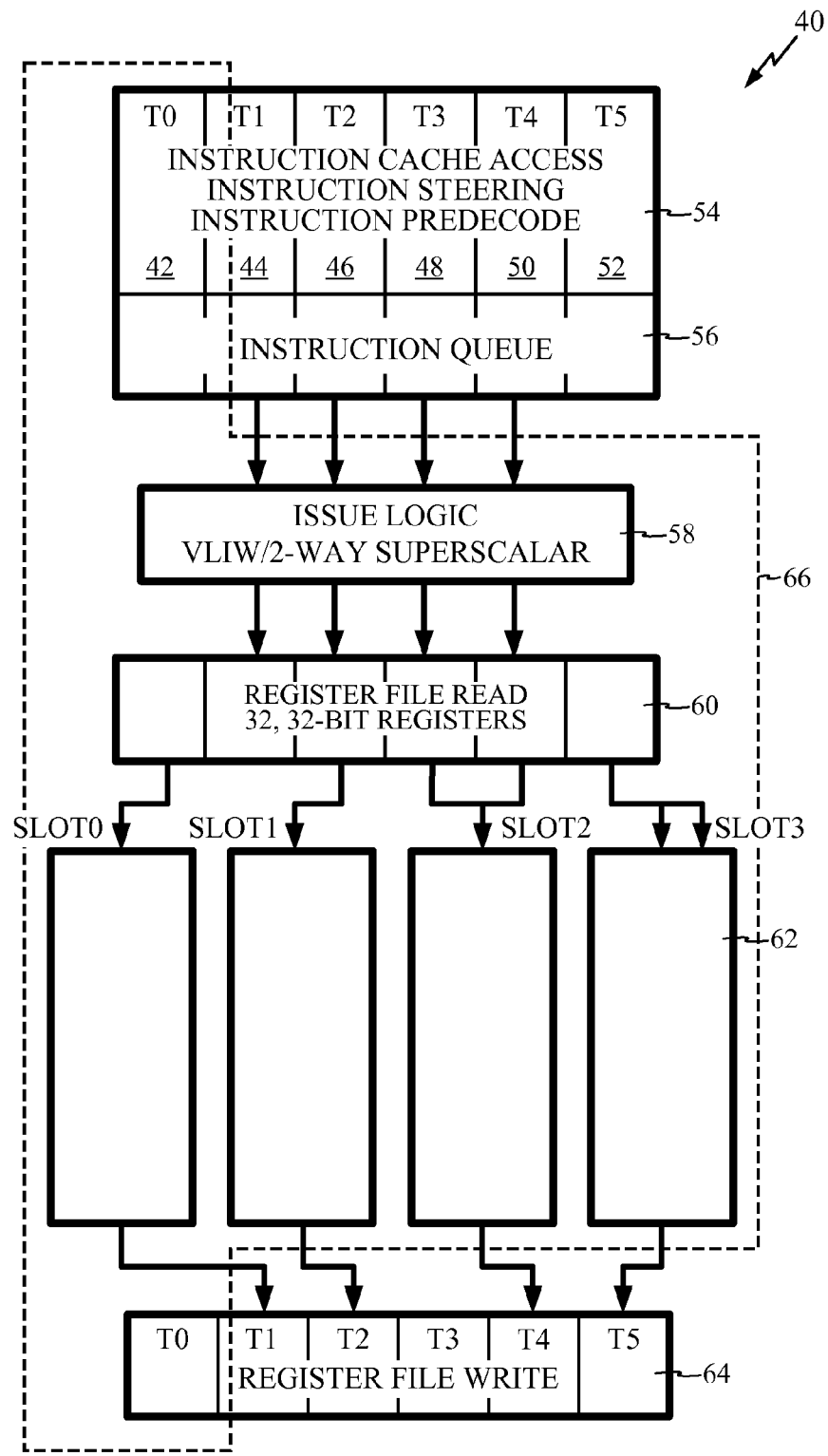
FIG. 2 illustrates a DSP architecture for carrying forth the teachings of the present disclosure.

FIG. 2 illustrates DSP 40 architecture that may serve as the transmit data processor 16 and receive data processor 28 of FIG. 1. We emphasize that DSP 40 only represents one embodiment among a great many of possible digital signal processor embodiments that may effectively use the teachings and concepts here presented. In DSP 40, therefore, threads T0:T5 (reference numerals 42 through 52), contain sets of instructions from different threads. Circuit 54 represents the instruction access mechanism and is used for fetching instructions for threads T0:T5. Instructions for circuit 54 are queued into instruction queue 56. Instructions in instruction queue 56 are ready to be issued into processor pipeline 66 (see below). From instruction queue 56, a single thread, e.g., thread T0, may be selected by issue logic circuit 58. Register file 60 of a selected thread is read and read data is sent to execution data paths 62 for SLOT0:SLOT3. SLOT0:SLOT3, in this example, provide for the packet grouping combination employed in the present embodiment.

Output from execution data paths 62 goes to register file write circuit 64, also configured to accommodate individual threads T0:T5, for returning the results from the operations of DSP 40. Thus, the data path from circuit 54 and before to register file write circuit 64 forms a processing pipeline 66. The present embodiment may employ a hybrid of a heterogeneous element processor (HEP) system using a single processor with up to six threads, T0:T5. Processor pipeline 66 has six stages, which matches the minimum number of processor cycles necessary to fetch a data item from circuit 54 to registers 60 and 64. DSP 40 concurrently executes instructions of different threads T0:T5 within a processor pipeline 66. That is, DSP 40 provides six independent program counters, an internal tagging mechanism to distinguish instructions of threads T0:T5 within processor pipeline 66, and a mechanism that triggers a thread switch. Thread-switch overhead varies from zero to only a few cycles.

DSP 40, therefore, provides a general-purpose digital signal processor designed for high-performance and low-power across a wide variety of signal, image, and video processing applications. FIG. 3 provides a brief overview of the DSP 40 architecture, including some aspects of the associated instruction set architecture for one manifestation of the disclosed subject matter. Implementations of the DSP 40 architecture support interleaved multi-threaded (IMT) processing. In this execution model, the hardware supports concurrent execution of multiple hardware threads T0:T5 by interleaving instructions from different threads in the pipeline. This feature allows DSP 40 to include an aggressive clock frequency while still maintaining high core and memory utilization. IMT processing provides high throughput without the need for expensive compensation mechanisms such as out-of-order execution, extensive forwarding networks, and so on. Moreover, the DSP 40 may include variations of IMT processing, such as those variations and novel approaches disclosed in the commonly-assigned U.S. patent applications by M. Ahmed, et al, and entitled "Variable Interleaved Multi-threaded Processor Method and System" and "Method and System for Variable Thread Allocation and Switching in a Multi-threaded Processor."

FIG. 3, in particular, provides a core processing architecture block diagram 70 for DSP 40 as applied to a single thread that may employ the teachings of the disclosed subject matter. Block diagram 70 depicts shared instruction cache 72 which receives instructions via Bus interface (I/F) 73 from AXI Bus 74, which instructions include mixed 16-bit and 32-bit instructions. These instructions reach to sequencer 76, user control register 78, and supervisor control register 80 of threads T0:T5. The core-level system architecture of the disclosed subject matter also includes in-silicon debugging system(ISDB) 82, which interfaces core processor 70 via JTAG interface 84, both of which are described in more detail below.

Sequencer 76 provides hybrid two-way superscalar instructions and four-way VLIW instructions to S-Pipe unit 86, M-Pipe unit 88, LD[Load]-Pipe 90, and LD/ST[Store]-Pipe unit 92, all of which communicate with general registers 94. AXI Bus 74 also communicates via Bus I/F 73 with shared data cache 96 LD/ST instructions to threads T0:T5. Optional L2 Cache/TCM 98 signals include LD/ST instructions with shared data TCM 100, which LD/ST instructions further flow to threads General Registers 94. From AHB peripheral bus 102 MSM specific controller 104 communicates interrupts with T0:T5, including interrupt controller instructions, debugging instructions, and timing instructions. Global control registers 106 communicates control register instructions with threads T0:T5.

DSP 40, therefore, includes six virtual DSP cores, each containing global control registers 106 and private supervisor control registers 80. Global control registers 106 are shared between all threads. Each thread shares a common data cache and a common instruction cache. Load, store, and fetch operations are serviced by a common bus interface. High performance AXI bus 74 and a lower performance AHB bus 102 are used to connect the data and instruction traffic to off-core memory and peripherals. An integrated level two memory (cache and/or TCM) input 98 is optional. Peripheral access may be through memory-mapped loads and stores. The physical address partition between AHB and AXI may be configured at the MSM level.

Clearly, the presented architecture for DSP 40 may evolve and change over time. For example, the number of instruction caches that DSP 40 may use could change from six to one, or other numbers of caches. Superscalar dispatch, L1 data at TCM 98, and other architectural aspects may change. However, the present subject matter may have continued relevance in a wide variety of configurations and for a large family of modifications of DSP 40.

ISDB 82, through JTAG interface 84, provides a hardware debugger for DSP 40. ISDB 82 provides software debug features through JTAG interface 84 by sharing system or supervisor-only registers. These registers are divided into supervisor control registers 80 on a per thread basis, as well as global control registers 106 between all threads. The system control registers are used for per thread interrupt and exception control and per thread memory management activities. Global registers allow interacting with the ISDB 82 for debugging operations.

ISDB 82 enables software developers to debug their software while DSP 40 operates. ISDB 82 hardware, in combination with a software debugger program operating in ISDB 82, may be used to debug the DSP 40 operating system software. ISDB 82 supports debugging hardware threads individually. Users may suspend thread execution, view and alter thread registers, view and alter instruction and data memory, single step threads, stuff instructions to threads, and resume thread execution. Trusted users have access to all of ISDB 82 features, while untrusted users have access to a subset of features.

ISDB 82 may interface with a debugger interface card to communicate with ISDB 82 debugging software residing on a program counter (PC), yet all through JTAG interface 84. Host debugger software may interact with the ISDB 82 by reading and writing ISDB control registers. Communication, for example, may be through a 40-bit packet which identifies the ISDB register to which read/write is to occur, as well as a 32-bit data payload. A packet format supporting this operation may be up to 64 control registers which may be 32 bits wide each.

FIG. 4 shows important aspects of ISDB/JTAG interface 110 between the debugging mechanism and the core processor of the disclosed subject matter. In association with DSP 40 core architecture 70, ISDB 82 communicates with JTAG 84 via path JTAG interface path 112, from ISDB JTAG circuit 114. ISDB JTAG circuit 114 processes data flows between JTAG 84 and ISDB 82. ISDB JTAG circuit 114 further interfaces ISDB JTAGSync circuit 116. ISDB JTAGSync circuit 116 communicates further with ISDB controller 118, instruction unit (IU) 120 and control unit (CU) 122. Particularly, ISDB JTAGSync circuit 116 interfaces IU ISDB logic circuit of IU 120 and CU ISDB Controller 126 of CU 122. CU ISDB controller 126 communicates with CU ISDB logic circuit 128, as well as ISDB controller 118. Control outputs from ISDB controller 118 include ISDB data output 130, ISDB reset signal 132, and ISDB interrupt 134. Further interfaces to ISDB controller 118 include MCD interface 136 and ETM breakpoint trigger 138.

FIG. 5 presents a processing mode diagram 140 for the various mode control aspects of DSP 40, including operations of ISDB 82 during debugging processes. In FIG. 5, DSP 40 supports processing modes that are both global to all threads and local to individual threads. Each DSP 40 hardware thread individually supports two execution modes, USER mode 142 and SUPERVISOR mode 144, and three non-processing modes of WAIT mode 146, OFF mode 148, and DEBUG mode 150, all as may appear in FIG. 5. The mode of a thread is independent of other threads, for example one thread may be in WAIT mode 146 while another is in USER mode 142, and so on.

The per-thread mode state diagram of FIG. 5 is supported by various instructions or events. These include "Except" or internal exception event, an "Int" or external interrupt event, an "RTE" or software return instruction from exception mode, and "SSR" or update to SSR register instruction, a "Stop" or software stop instruction that may be entered from any mode, a "Start" or software Start Instruction that also may be entered from any mode, a "trap" or software Trap Instruction, a "Wait" or software wait Instruction, a "Resume" or software Resume Instruction, a "DE" or Debug Event, and a "DR" or Debug Instruction. While the functions in different implementations of the claimed subject matter may vary slightly from those here presented, the meanings of "Start," "Wait," "Resume," "DE," and/or "DR" may be given their broadest interpretations consistent with the scope of the claimed subject matter.

Registers are available in DSP 40 in both USER mode 142 and SUPERVISOR mode 144. The user-mode registers are divided into a set of general registers and a set of control registers. General registers are used for all general purpose computation including address generation, scalar and vector arithmetic. Control registers support special-purpose functionality such as hardware loops, predicates, etc. General purpose registers are 32 bits wide and may be accessed as single registers or as aligned pairs of two registers. The general register file provides all operands for instructions, including addresses for load/store, data operands for numeric instructions, and vector operands for vector instructions.

DEBUG mode 150 provides a special state where the thread is waiting for commands from ISDB 82. Whenever an ISDB Debug Event occurs, such as by the execution of a software breakpoint instruction, a breakpoint command from ISDB 82, or occurrence of a hardware breakpoint, indicated threads may enter DEBUG mode 150. While in DEBUG mode 150, the core is controlled by ISDB 82 via commands from JTAG interface 84. When the ISDB 82 releases the thread due to execution of a resume command, the thread may resume operation according to their current mode settings. When a thread is in DEBUG mode 150, it is controlled by ISDB 82 and cannot be controlled by other threads. A Wait, Resume, Start, or Stop instruction from a running thread, targeting a thread in DEBUG mode 150, may be ignored. Similarly, a Non-Maskable Interrupt (NMI) may be ignored by threads in DEBUG mode 150.

A HARDWARE RESET mode (not shown in FIG. 5) and DEBUG mode 150 are global to all threads. Whenever the hardware reset pin is asserted, regardless of any thread's processing state, DSP 40 may enter HARDWARE RESET Mode. In HARDWARE RESET mode, all registers are set to their reset values. No processing may occur until the hardware reset pin is de-asserted. When the reset pin is asserted, the processor may transition into reset mode and all registers may be reset to their HARDWARE RESET values. After the reset pin is de-asserted, thread T0 may be given a soft reset interrupt. This may cause thread T0 to enter SUPERVISOR mode 144 and begin executing at the reset vector location. All other threads may remain off. At this point, the software is free to control mode transitions for each thread individually.

FIGS. 6 through 16 relate to the presently disclosed novel and advantageous features of an embedded trace macrocell (ETM) unit of DSP 40, which enhances user debugging of code by capturing in real-time detailed information about the software execution flow. The ETM non-intrusively monitors and records selected DSP 40 execution, forms the execution information into packets, and sends out the packet stream either off-chip or to an on-chip memory known as an ETB. The ETM also contains a number of mechanisms to limit or focus the generation of trace information to the region of interest. Using the packet stream, a reconstruction of the execution can be created, giving the user direct visibility of the code's runtime behavior.

The ETM, therefore, provides comprehensive debug and trace functions for DSP 40 and other similar digital signal processors. These functions allow information on the processor's state to be captured both before and after a specific event, while adding no burden to the processor's performance, even as DSP 40 runs at full speed. The ETM may be configured in software to capture only select trace information and only after a specific sequence of conditions. A dedicated, configurable, trace port and FIFO then allow the compressed trace data to be read from the chip by an external trace port analyzer without interrupting, or affecting, the processor.

The trace port can be configured from a 1- to 32-bit data bus, with trace clock independent to the core clock. For example, the data rate from the ETM can be half of the core clock and the number of pins increased to maintain the data bandwidth. Similarly, the number of pins can be halved and the data rate increased. The ETM may be used in both stand-alone and within a multi-core environment to allow the developer to view simultaneous, correlated trace from multiple, asynchronous cores.

FIG. 6 provides block diagram 160 depicting a variety of overall ETM functions supporting the present disclosure. DSP core processor 70 interfaces ETM 162, which includes triggering and filtering circuit 164 and compression and packetization circuit 166. Following processing by triggering and filtering circuit 164 and compression and packetization circuit 166, ETM output 168 flows to trace repository 170, which may be, for example, an embedded trace buffer (ETB) circuit or an off-chip circuit. From trace repository 170, software execution records flow as output 172 to debug host 173. Debug host 173 includes decompressor component 174 for receiving trace repository output 172 and generating there from reconstructed execution flow 176. ETM 162 receives control input 178 from JTAG 84, which input JTAG 84 generates in response to data and instructions from Debug Host 173.

As shown in FIG. 6, the ETM 162 monitors the DSP 40 pipeline. Using this information, ETM 162 performs two primary functions: filtering/triggering and compression/packetization. The filtering and triggering operations are programmed by the user through JTAG interface 84 and are used to define when to turn tracing on and off. The compression/packetization unit takes the DSP 40 execution information and efficiently forms it into packets that are sent out of ETM 162 through the trace port. The trace stream leaving ETM 162 is fed into trace repository 170. Trace repository 170 provides a large memory capacity for recording trace records and may be either off-chip or on-chip. The on-chip repository is known as an embedded trace buffer (ETB). Decompressor component 174 is a software component running on Debug Host 173 that takes the packet stream from trace repository 170 and, along with the program image, reconstructs the execution flow of DSP 40, giving the user detailed visibility into the DSP pipeline 66.

ETM 162 provides trace instruction sequencing and timing for all six threads, as well as the ability to record and send out profiling counts (cache misses, bank conflicts, and micro-tlb misses). ETM 162 may trigger on PC and LDST addresses, as well as on LDST data. ETM 162 supports serial and external event detections. Moreover ETM 162 may also generate ISDB breakpoint trigger events, external trigger event, and DSP 40 interrupts. ETM 162 is programmable through JTAG 84 and may support a dedicated ETB trace repository 170 of, in one embodiment, 512×32 bits, in one embodiment. ETM 162 may contain 4-trigger blocks (each with 2 address and 1 data comparators) and may contain a 3-state sequencer. ETM 162 tracing may operate under the control of a secure DSP 40 enable register, and may be programmed for operation during DSP 40 power collapse.

ETM 162 generates an instruction trace as a recording of the full progression of the program counter for a thread over a given window in time. Optionally, the timing of the program counter progression (i.e., identification of stall cycles) can also be included in an instruction trace. The event-resources mechanisms are used to define when to generate these instruction traces. The trigger and filtering functions are controlled through the programming of the event-resources. In more detail, the event-resources control filtering, triggering, and ISDB breakpoint generation. Filtering includes the functions of deciding when to enable and disable an instruction trace. Triggering involves deciding when to insert a trigger marker into the packet stream. ISDB breakpoint determination involves specifying the conditions under which ISDB 82 generates and responds to a breakpoint for debugging operations.

ETM 162 contains a number of primary event resources (e.g., address and data comparators) to detect when specific conditions within DSP 40 occur (e.g., whether a certain PC is executed, or if a certain memory location is read). In addition, there are secondary event resources (trigger blocks and the sequencer) which enable detection of more complex arrangements of events.

ETB trace repository 170 provides an on-chip memory area where trace information is stored during capture rather than being exported immediately through a trace port at the pins of the device. The stored information can then be read out at a reduced clock rate from ETB trace repository 170 once capture has been completed. This is done through JTAG interface 84. This two step process removes the necessity for a wide trace port that uses many, high-speed device pins. Effectively, a "zero-pin" trace port is created where the device already has a JTAG port at the pins. ETB trace repository 170 may accept data at a higher frequency and with the full 32-bit data port, exceeding trace port bandwidth limitations and may integrate with a RAM block supplied by the system integrator.

In one embodiment, ETB trace repository 170 has a size of 2 KB arranged as 512 entries, each 32-bits wide. However, other sizes for ETB trace repository are clearly within the scope of the disclosed subject matter. ETB trace repository 170 interfaces with the user through a set of JTAG accessible registers. Each register can be read or written through JTAG interface 84. These registers are used to set up ETB trace repository 170 for a trace-capture session and to read out the contents of ETB trace repository 170 once trace capture is complete. ETB trace repository 170 provides a read-pointer as an index into the ETB trace repository 170 memory array. When reading out the contents of ETB trace repository 170 through JTAG interface 84, the read-pointer indicates the location to read. ETB trace repository 170 also provides a write-pointer as an index into the ETB trace repository 170 memory array. When trace data is written into ETB trace repository 170, it is written to the entry indicated by the write-pointer. Each of the write operations auto-increment the write-pointer to the next location after write occurs. ETB trace repository 170 may only capture a small window of the ETM trace stream. The ETB looks for a trigger packet from the ETM to determine when to capture data and the trigger-counter is used to specify the division between pre-trigger data and post-trigger data captured by ETB trace repository 240.

ETM 162, therefore, aids a programmer in debugging code for DSP 40. ETM 162 generates instruction traces which are a record of the execution flow for a thread over a given window in time. Using a recorded instruction trace, the programmer can see a detailed view of their code's runtime behavior. For example, if the user's program generates and unexplained exception, the ETM 162 aids in determining the flow of instructions leading up to the exception, thereby allowing the user to assess exactly what happened. ETM 162 uses a particular packet-based protocol for efficiently representing program flow and for minimizing the generation of trace data.

One aspect of ETM 162 includes a sequencer process for chaining of events and more complex event detection scenarios. To illustrate operation of the sequencer process and associated trigger block circuits 180, FIG. 7 presents sequencer flow diagram 190. In response to trigger block circuit inputs 182:188, sequencer process 180 operates in the shown example at three states, S0:S2. For operation of sequencer process 310, from state S0 process flow may go to S1 or S2. From S1, sequencing advances either ahead to S2 or back to S0. From S2, sequencing advances to either S1 or S0.

Sequencer process 180, therefore, includes three states S0:S2, with the transitions between states being programmable and based on matches from trigger blocks circuits 182:188. Sequencer process 180 has use in trace filtering for enabling each trigger blocks circuits 182:188 to be conditioned on state-enables. This allows tracing to be restricted to certain states. Upon entering a new state, the counter in each trigger blocks circuits 182:188 may be reloaded to an initial value. Upon entering a given state, an ISDB breakpoint can be asserted. Upon entering a given state, a trigger marker can be inserted into the trace stream. Upon entering a given state, an external trigger control may also be asserted. The external trigger may remain asserted anytime that the sequencer is in the given state. Upon entering a given state, an interrupt to DSP 40 may be asserted. After reset, the counter is initialized to S0. If multiple transitions fire at the same time, the sequencer remains in the current state.

In one embodiment, ETM 162 contains six counters that can record various events related to DSP 40 performance. The basic operation makes use of each counter as a programmable source. A user-programmable region counter divides execution into windows of a fixed number of cycles. During the window, the events are accumulated into counters. At the end of the window, the counter values are formed into packets and sent out through the trace port. The counters are then reset and the process begins again. When the profiling unit is operated in at the same time as the program flow tracing, this results in the program flow trace being overlaid with detailed information about performance events. In addition, the profiling unit contains a state-enable mask to limit when the unit is active.

A region counter is used to divide up the execution into windows of a fixed number of cycles. The size of the region is determined by a user-programmable register. The region counter is initialized to the user-specified value, and all of the profiling-event counters are reset. The region counter then begins counting down. When the region counter reaches zero, the value for each of the profiling-event counts is emitted in the trace stream. The process then begins again. The region-counter only counts when the state-enable matches. When the profiling is inactive, the region counter maintains its value and resumes when an enabled state is re-entered.

Different events for which a profiling counter may accumulate information include (a) d-cache misses; (b) d-cache stall cycles; (c) i-cache misses; (d) i-cache stall cycles; (e) ITLB and DTLB misses; and (f) total stall cycles. In addition, each profiling counter contains a six-thread mask to restrict the counter to events that occur in certain hardware threads.

As with the region counter, the profiling counters are only active when the state-enable mask matches the current state. During all other times the counts maintain their values and counting resumes when an enabled state is re-entered.

The present disclosure provides a novel packet protocol set of functions to support inter-thread trace alignment. That is, for any thread that is being traced using ETM 162, at any arbitrary point in time, the present disclosure allows identifying for all other threads being traced the program counter value and instruction state (e.g., stalled, executed, etc.) of those threads at that point. Thus, when ETM 162 operates in a cycle-accurate mode, trace-alignment makes use of a trace-port protocol supporting inter-thread trace alignment. The present disclosure, therefore, make cycle-count fields for isync-restart packets thread-relative, as well as the cycle-count field fully precise for inter-thread alignment. The disclosure arrangement generates an isync-periodic packet on the same thread cycle for all threads. This further allows for re-alignment, in the event that thread alignment is lost for any reason.

In one embodiment of the present disclosure provides for the execution of multiple instruction sequences occurring concurrently and during which DSP 40 may be viewed as several single-threaded processors operating independently. In ETM 162, program flow is broken down into a sequence of packets and that include thread number (tnum) fields to certain packets to identify which packet belongs to which thread. For identifying inter-thread timing relationships, the present disclosure establishes and maintains timing relationships between different threads. Because each thread may enable and disable instruction tracing independently, when a thread turns on instruction tracing, other threads may already have had their tracing enabled for some time. The presently disclosed method and system establish the relative timing of the threads execution sequences by marking the offset between when a thread turns on tracing and when other threads have turned on and do subsequently turn on tracing.

The present disclosure, therefore, includes a thread cycle-offset field for indicating the number of cycles since the last thread turned on tracing. Also, if no other threads are active, the cycle-offset field contains the number of cycles since the most recent trace turn-off among all threads. After a trace session, the packets allow for reconstructing the thread execution. Then, using the offset-fields, the execution sequences may be properly aligned among the threads. In addition, an instruction-alignment mechanism allows re-establishing execution tracing in case of a data loss.

The disclosed subject matter furthermore allows re-establishing the inter-thread timing relationships. By maintaining a global counter that permits periodically generating synchronization packets, when the counter reaches zero, a packet may be generated for each thread. Such a packet contains the current program counter value for that thread. Now, because of various limitations that may exist with DSP 40 relating to simultaneous packet generation for all threads, the present disclosure includes a cycle-offset field to a synchronization packet. The cycle-offset field indicates the number of cycles since the last thread (among the other threads) generated a synchronization packet. The cycle-offset field is of limited size and if the count saturates, synchronization will not be able to be achieved and may wait for the counter. Using these mechanisms, which are more fully described below, the present disclosure allows maintaining inter-thread execution timing relationships at any given point for one thread. The result is the ability to observe operations and states of all threads for debugging and other important purposes.

With this understanding, FIG. 8 illustrates important concepts of the presently disclosed inter-thread trace alignment process. Referring to FIG. 8, inter-thread alignment process 200, is based at time t=0, as time line 202 indicates. For the various threads 204, 206, 208, 210, and 212 that may be operating on DSP 40, thread initiation may occur at different points in time. Thus, at time t=$t_0$, thread 204 may initiate operations. Then, at a later time, t=$t_1$, thread 206 may initiate operations. At time, t=$t_2$, thread 208 begins, at t=$t_3$, thread 210 begins operations, and at t=$t_4$, thread 212 initiates operations. As will be described more fully below, in duration 214 represents the number of cycles until tracing becomes active for thread 212. Duration 214 represents the number of cycles for the trace-start program counter (PC) from the isync-restart packet. For all inter-related threads 204:212, an isync-periodic packet is generated for all threads at the same time. Furthermore, duration 220 addresses the situation of a long stall occurring, for example, in thread 212.

To more fully describe the inter-thread operations of the present disclosure, FIG. 9 shows a functional overview of one embodiment of a packet generation unit 230. Packet generation unit 230 includes packet generation control circuitry 232, which received inputs of atomW, atomN, and atome for generating outputs of genTsyncP, genAsync, genBranch, genPheader, genIsyncR, genProf, and genCCount to FIFO input mux 234. Pheader generation circuit 236 receives w-count, e-count, and n-count inputs from packet generation control circuit 232 and atome input, all for generating pheaderPK output to FIFO input mux 234. PC/tld/asid/tnum input flows to isync-restart/cycle-count generation functions 238, isync-periodic generation functions 240, and branch-address generation functions 242. Isync-restart/cycle count generation functions 238 provide isyncRPK, isyncRLen, CCPK, and CCLen outputs to FIFO input mux 234. Isync-periodic generation functions 240 provide isyncPPK and isyncPLen inputs into FIFO input mux 234. Branch-address generation functions 242, which also receives branch-type inputs, provides branchPK and branchLen outputs to FIFO input mux 234. Furthermore, profile generations functions 244 receives profile identifier inputs for generating profPK and profLen outputs to FIFO input mux 234.

FIFO input mux 234 takes all of the packets that need to be generated on a given cycle and forms them into a contiguous chunk. FIFO input mux 234 must account for packets being variable sized when doing its concatenation. The output of FIFO input mux 234 is registered before being sent to the FIFO.

For the present disclosure packet generation and FIFO input mux 234 operations occur across three stages. In the first stage of packet generation, packet generation control functions 232 and individual packet generation engines 236 through 244 operates, as well as atom counters w-count, e-count, and n-count increment. FIFO input mux 234 operations include merging all packets generated in the cycle into a contiguous block in this first stage. In the second stage, FIFO write occurs to include rotating data to align to FIFO write pointer, computing and rotating write-enables, and writing data into FIFO mux 234 registers. At the third stage, FIFO read stage, data may be read from FIFO registers. At this third stage, also the special case of inserting the trigger packet and sending data to ETB occurs.

As seen in FIG. 9, each of the individual packet generation units packetizes its respective data and then sends the resulting packet and length to FIFO input mux 234 for concatenation. In addition, packet generation control circuit 232 maintains the atom counters and decides which packets to generate on a particular cycle. Packet generation unit 230 maintains three counters to record the number of pending atoms that may be sent out in future pheader or cycle-count packet. The E-atom counter increments whenever an E-atom is encountered. The N-atom counter increments whenever an N-atom is encountered and the count includes the current atom. That is, if the current atom is an N, it will be included in the N-atom count. The W-atom counter increments whenever a W-atom is encountered. These counters are per-thread counters and, as such, there are six copies of each in the present embodiment. The counters are reset whenever the counts are sent out through a pheader or cycle-count packet.

From branch address generation functions 242, a branch address packet may be generated for a target of an indirect branch loopback, if the target is different from previous loopback. If all-loopbacks mode is set, the packet is sent out for every loopback. Also a new loopback packet is forced out after an isync-restart and isync-periodic packet is generated. The target of a PC-relative branch IF direct-branches mode is then set. The target of an event (interrupt, exception, SWI, TRAP, etc.) returns the RTE instruction. The branch-address packet may be generated when trace-enable is asserted and it is not the first cycle of tracing (an isync-restart packet may be generated instead). The packet generation control unit maintains a previous-loopback target register for each thread to determine if a loopback branch-address packet is needed.

FIG. 10 shows table 250 of definitions for the various atoms applicable to the instructions of the presently disclosed subject matter. A major goal of the packet protocol is to support inter-thread trace alignment. That is, for any thread that is being traced, at any arbitrary point in time, the user should be able to identify for all other threads being traced the program counter value and instruction state (stalled, executed) of those threads at that point. Trace-alignment works when ETM 162 operates in cycle-accurate mode. The trace-port protocol has been extended to support inter-thread trace alignment. An 'S' type instruction atom provides a branch mechanism known as a dual jump. Here, ETM 162 includes an S-type, which is defined using a pheader-format4 packet type to hold the atom.

FIG. 11 provides a branch-address packet 280 for the present disclosure that supports a 32-bit TID field. The presently disclosed branch-address packet supports a 32-bit TID field, the contents of appear in FIG. 11. The branch-address packet is variable length, including between 1 and 11 bytes. Continuation bits in the MSBs of bytes 0 through 4 indicate if packet continues beyond that point. Separately, the T-bit indicates whether a type-field will be appended to the end of the packet. A 1 in the MSB of byte-4 indicates that 5 bytes will follow (4 bytes of the TID and 1 byte of ASID).

The branch-address packet is variable with PC, TID/ASID, and type compression. The TID/ASID may be sent out if either one has changed since the last branch-address packet or isync (restart or periodic) for the tnum. The type may be sent out if it has changed since the last type was sent out. It may be generated on the first branch-address packet after a isync-restart or isync-periodic. The PC is compressed relative to the previous PC sent by a branch-address, isync-restart, or isync-periodic. The lower portion of the PC that has changed may be sent out. For each thread, previous PC, previous TID/ASID, and previous type registers are used to determine the proper compression.

FIG. 12 present exemplary contents of an isync-restart packet 260 for use in the presently disclosed process. The isync-restart packet may be generated when tracing is initiated (trace-enable was previously low). In addition, when coming out of an overflow condition, if trace-enable is still high, an isync-restart packet is generated with the reason field indicating that there was an overflow. The present disclosure provides alignment using isync-restart packets. Instruction alignment can be viewed as assigning a global thread-cycle to every cycle of every thread being traced. A decompressor procedure accomplishes this for the case when isync-restart packets are available in the trace stream. The decompressor will maintain a counter value of the last isync-restart-count.

Anytime an isync-restart packet is encountered, the present disclosure may inspect the cycle-count field and cycle-count type field. If the type-field is 'global', the process assigns a last-isync-restart-count to the cycle-count field value and annotates that packet with last-isync-restart-count. If the type-field is 'offset', the process may increment the last-isync-restart-count by the value in the cycle-count field and further annotate the packet with last-isync-restart-count. At which point, each isync-restart packet will be annotated with a global thread-cycle value.

The next step is to annotate the atoms. The process splits the trace-stream into the individual thread-local packet-streams based on the tnum values in the packet-stream. For each thread-local packet-stream, the process maintains a variable global-thread-cycle. This value is maintained such that anytime an isync-restart packet is encountered, global-thread-cycle is assigned to the value that was annotated. Each time an instruction atom is encountered (E, N, S, or W) the process may annotate that atom with global-thread-cycle and increment global-thread-cycle by 1. Using the normal decompression procedure, the process determines the program counter values for each atom. After this procedure is applied, every cycle of every thread being traced may be annotated with a global thread-cycle count value. As a result, for example, for a given thread cycle, the current program counter value for all six threads may be determined, as well as the state of the pipeline for those threads (stalled, executed, etc.)

For the non-cycle-accurate version, the TID field is expanded to 32-bits. For the cycle-accurate version, the TID is expanded to 32-bits and the new cycle-count field is defined to support trace-alignment. A global cycle-count indicates the number of thread-cycles since the last hardware reset. An offset cycle-count indicates the number of cycles since the last isync-restart packet was generated.

FIG. 13 depicts an embodiment of an isync-periodic packet 290 for supporting the presently disclosed subject matter. Isync-periodic packets include an 'offset' field that indicates the number of thread-cycles since the last isync-periodic packet has been generated (from among all threads). The disclosed process also supports alignment using isync-periodic packets. In some cases only a limited window of trace data is available. Therefore an isync-restart packet may not be available. In these cases the isync-periodic packet may be used to determine inter-thread alignment. If packet boundaries are unknown, the process may search for an async-packet to recover packet alignment. The decompressor may maintain a counter last-isync-periodic-count. Going through the multi-thread packet stream, the process may include searching for the oldest isync-periodic packet that does not have an offset field. Then, the process may assign the last-isync-periodic-count to 0 and annotates that packet with the value. For each of the following isync-periodic packets from the other tnums, the process may increment the isync-periodic-count by the offset-field value and each of the isync-periodic packets with isync-periodic-count. Then, the process may split the threads into individual packet-streams and decompresses them separately.

The ETM isync-periodic counters may be decremented whenever packet bytes are sent to the FIFO. When the counter reaches zero for a thread, an isync-periodic packet may be marked as pending. At the next opportunity, the isync-periodic packet is generated. An isync-periodic may be held back if any of the following packets are being generated (isync-restart, trigger, branch-address, async, profile). Each thread may maintain its own isync-periodic counter. The isync counters may be reset whenever any isync-restart packet is generated for that thread.

FIG. 14 presents a set of cycle count packets for use in the presently disclosed process. A cycle-count packet may be used to accumulate W-atoms. Also the cycle-count packet may only generated in cycle-accurate mode. The cycle-count packet may be generated in the following cases: switch from W to E or W to N and W-atom count does not fit into format-3 pheader capacity, atom-break with W atoms pending and too many W atoms to fit into a format-3 pheader. The W-atoms may be placed into the cycle-count packet and the E or N atom may come out in a format-1 pheader, and cycle-count packet may reach its fully-accurate maximum. Instead of allowing the cycle-count packet to increment to the until it reaches its maximum 32-bit value, the ETM sends out multiple smaller cycle-count values at the limit between full accuracy and limited accuracy. In this case the current atom may be a W-atom. Because this atom is not included in the packet, the count is reset to 1 instead of 0.

The cycle-count in the isync-restart packet has been redefined as two possible types: a 64-bit 'global' count that is referenced from the last hardware reset, and a 16-bit offset count that indicates the number of thread cycles since the last isync-restart packet (from among all threads).

In addition to two-byte 300 and three-byte 310 cycle-count packets, the present disclosure provides a three-byte packet 320 to fit a 32-bit value into the 16-bit payload. In the present subject matter, a five-byte packet, which includes a one-byte header and four-byte payload is defined as shown in FIG. 14. For each thread, the disclosed process maintains a count global-thread-cycle. For the first isync-periodic packet that is encountered, the process sets a global-thread-cycle to that packet's annotated value and annotates the previous atom with that value. The global-thread-cycle is then incremented by 1. Anytime an atom (E, N, S, W) is encountered, the process annotate that atom with the global-thread-cycle and increments the global-thread-count by 1. The process may decompress the stream as normal to assign program counter values to each atom. At this point, as before, every cycle of every thread being traced will have a global thread-cycle associated with it.

FIG. 15 shows one embodiment of a pheader format4 packet 330 as relevant to the present disclosure. The pheader packets may be generated in different cases. For example, when no more atoms can be held in the packet, and when a branch-address, profile, or isync-periodic packet is generated, a pheader is generated to mark the location of the respective packet within the atom stream. The format-1 pheader packet may have three atom payload fields: from 0 to 31 E atoms (field-0), followed by 0 to 3 N atoms (field-1), followed by 0 or 1 E atom (field-2). The rules for generating format-1 pheader packets may be: atom-E count at maximum, and current atom is an E. The counted E's will go into field-0, and the current E atom may be placed into field-2. The atom-N count at maximum (count includes current N atom). Counted E's may be placed into field-0 and N atom count may be placed into field-1. The current atom is E and the N atom count is non zero. The counted E and N atom counts may be placed in field-0 and field-1 and the current E atoms may be placed in field-2. When the current atom is a W and E or N atoms are pending, the current E and N counts may be sent out in payload field-0 and field-1. When atom-break and no W atoms pending, current E and N counts may be placed in field-0 and field-1, and if the current atom is E, it may be placed in field-2.

FIG. 16 depicts an async packet 340 for use with an embodiment of the disclosed subject matter. The async packet length accommodates a longer cycle-count fields and may, for example, include ten bytes. The async-periodic counter may also be used to define when async packets are generated. An async packet is marked as pending whenever the ETM periodic counter reaches. The async packet must come out by itself, and will remain pending whenever other packets are generated. The async counter is global and may be decremented whenever packet bytes are sent to the FIFO.

In summary, the disclosed subject matter provides a method and system for inter-thread trace alignment with a multi-threaded processor for use with execution trace processing. The disclosed subject matter, therefore, includes recording timing data relating to a common predetermined event. Such an event may be the number of cycles since a last thread initiated execution tracing or the number of cycles since all threads terminated execution tracing. The number of cycles at which a thread initiates execution tracing is referenced to the common predetermined event for maintaining the timing of execution tracing. The data relating to the common predetermined event may then updated to associate with the time at which the thread initiated execution tracing. The result is to permit aligning the timing data associated with all threads. Interrelated records permit reconstructing interdependent execution tracing information for threads operating in the multi-threaded processor, as well as synchronizing timing data for all operating threads.

As seen above, the processing features and functions described herein for inter-thread trace alignment with a multi-threaded processor in a multi-threaded digital signal processor, including an interleaved multi-threaded processor, may be implemented in various manners. For example, not only may DSP 40 perform the above-described operations, but also the present embodiments may be implemented in an application specific integrated circuit (ASIC), a microcontroller, a digital signal processor, or other electronic circuits designed to perform the functions described herein. Moreover, the process and features here described may be stored in magnetic, optical, or other recording media for reading and execution by such various signal and instruction processing systems. The foregoing description of the preferred embodiments, therefore, is provided to enable any person skilled in the art to make or use the claimed subject matter. Various modifications to these embodiments will be readily apparent to those skilled in the art, and the generic principles defined herein may be applied to other embodiments without the use of the innovative faculty. Thus, the claimed subject matter is not intended to be limited to the embodiments shown herein but is to be accorded the widest scope consistent with the principles and novel features disclosed herein.

What is claimed is:

1. A method for inter-thread trace timing alignment among threads of a multi-threaded processor during an execution tracing process, comprising:

recording timing data relating to a common predetermined event, said common predetermined event being commonly referenceable by all operating threads of said multi-threaded processor during core processor execution tracing;

referencing a time at which a thread initiates execution tracing to said common predetermined event for maintaining the timing of execution tracing for said thread relative to said common predetermined event; and updating said common predetermined event to associate with said time at which said thread initiated execution tracing, thereby aligning said time at which said thread initiated execution tracing to timing data associated with all other threads of said multi-threaded processor for which execution tracing may be occurring.

2. The method of claim 1, further comprising relating said common predetermined event to a time at which a last thread turned on execution tracing.

3. The method of claim 1, further comprising relating said common predetermined event to the number of multi-threaded processor cycles since all threads turned off execution tracing.

4. The method of claim 1, further comprising recording said common predetermined event in a plurality of data packets.

5. The method of claim 1, further comprising reconstructing interrelated execution tracing information for threads operating in said multi-threaded processor using a plurality of data packets associated with said common predetermined event.

6. The method of claim 1, further comprising synchronizing said timing data relating to said common predetermined event.

7. The method of claim 1, further comprising generating a global count of cycles since the occurrence of said common predetermined event.

8. The method of claim 1, further comprising re-establishing inter-thread timing data among all threads performing execution tracing using a global count of cycles since said common predetermined event.

9. The method of claim 1, further comprising determining a data loss and, in response to said data loss, re-establishing inter-thread timing data among all threads performing execution tracing using a global count of cycles since said common predetermined event, in the event of a data loss.

10. The method of claim 1, further comprising generating a synchronization packet for all threads in the event of a global counter cycling through a zero value.

11. A hardware digital signal processor debugging system for operation in association with a digital signal processor and including the ability to interrelate timing data relating to threads of a multi-threaded processor during multi-threaded software execution flow, comprising:

a plurality of offset fields for recording timing data relating to a common predetermined event, said common predetermined event being commonly referenceable by all operating threads of said multi-threaded processor during core processor execution tracing;

time referencing instruction packets for referencing a time at which a thread initiates execution tracing to said common predetermined event for maintaining the timing of execution tracing for said thread relative to said common predetermined event; and time reference updating packets for updating said common predetermined event to associate with said time at which said thread initiated execution tracing, thereby aligning said time at which said thread initiated execution tracing to timing data associated with all other threads of said multi-threaded processor for which execution tracing may be occurring.

12. The digital signal processor debugging system of claim 11, further comprising circuitry and instructions for relating said common predetermined event to the time at which a last thread turned on execution tracing.

13. The digital signal processor debugging system of claim 11, further comprising circuitry and instructions for relating said common predetermined event to the number of multi-threaded processor cycles since all threads turned off execution tracing.

14. The digital signal processor debugging system of claim 11, further comprising circuitry and instructions for recording said common predetermined event in a plurality of data packets.

15. The digital signal processor debugging system of claim 11, further comprising circuitry and instructions for reconstructing interrelated execution tracing information for threads operating in said multi-threaded processor using a plurality of data packets associated with said common predetermined event.

16. The digital signal processor debugging system of claim 11, further comprising circuitry and instructions for synchronizing said timing data relating to said common predetermined event.

17. The digital signal processor debugging system of claim 11, further comprising circuitry and instructions for generating a global count of cycles since the occurrence of said common predetermined event.

18. The digital signal processor debugging system of claim 11, further comprising thread interrelating instructions for re-establishing inter-thread timing data among all threads performing execution tracing using a global count of cycles since said common predetermined event.

19. The digital signal processor debugging system of claim 11, further comprising execution tracing instruction for determining a data loss, in response to said data loss, re-establishing inter-thread timing data among all threads performing execution tracing using a global count of cycles since said common predetermined event.

20. The digital signal processor debugging system of claim 11, further comprising synchronization instructions for generating a synchronization packet for all threads in the event of a global counter cycling through a zero value.

21. A multi-threaded digital signal processor for operation in support of a personal electronics device, the multi-threaded digital signal processor comprising debugging means for performing an execution tracing process and, in relation thereto, aligning inter-thread trace timing among threads of said multi-threaded processor, comprising:

means for recording timing data relating to a common predetermined event, said common predetermined event being commonly referenceable by all operating threads of said multi-threaded processor during core processor execution tracing;

means for referencing a time at which a thread initiates execution tracing to said common predetermined event for maintaining the timing of execution tracing for said thread relative to said common predetermined event; and means for updating said common predetermined event to associate with said time at which said thread initiated execution tracing, thereby aligning said time at which said thread initiated execution tracing to timing data associated with all other threads of said multi-threaded processor for which execution tracing may be occurring.

22. The digital signal processor system of claim 21, further comprising means for relating said common predetermined event to the time at which a last thread turned on execution tracing.

23. The digital signal processor system of claim 21, further comprising means for relating said common predetermined event to the number of multi-threaded processor cycles since all threads turned off execution tracing.

24. The digital signal processor system of claim 21, further comprising means for recording said common predetermined event in a plurality of data packets.

25. The digital signal processor system of claim 21, further comprising means for reconstructing interrelated execution tracing information for threads operating in said multi-threaded processor using a plurality of data packets associated with said common predetermined event.

26. The digital signal processor system of claim 21, further comprising means for synchronizing said timing data relating to said common predetermined event.

27. The digital signal processor system of claim 21, further comprising means for generating a global count of cycles since the occurrence of said common predetermined event.

28. The digital signal processor system of claim 21, further comprising means for re-establishing inter-thread timing data among all threads performing execution tracing using a global count of cycles since said common predetermined event.

29. The digital signal processor system of claim 21, further comprising means for determining a data loss and, in response to said data loss, re-establishing inter-thread timing data among all threads performing execution tracing using a global count of cycles since said common predetermined event.

30. The digital signal processor system of claim 21, further comprising means for generating a synchronization packet for all threads in the event of a global counter cycling through a zero value.

31. A non-transitory computer usable medium having computer readable program code means embodied therein for debugging a multi-threaded digital signal processor including performing an execution tracing process and, in relation thereto, aligning inter-thread trace timing among threads of said multi-threaded processor, the computer usable medium comprising:

computer readable program code means for recording timing data relating to a common predetermined event, said common predetermined event being commonly referenceable by all operating threads of said multi-threaded processor during core processor execution tracing;

computer readable program code means for referencing a time at which a thread initiates execution tracing to said common predetermined event for maintaining the timing of execution tracing for said thread relative to said common predetermined event; and computer readable program code means for updating said common predetermined event to associate with said time at which said thread initiated execution tracing, thereby aligning said time at which said thread initiated execution tracing to timing data associated with all other threads of said multi-threaded processor for which execution tracing may be occurring.

32. The computer usable medium of claim 31, further comprising computer readable program code means for relating said common predetermined event to the time at which a last thread turned on execution tracing.

33. The computer usable medium of claim 31, further comprising computer readable program code means for relating said common predetermined event to the number of multi-threaded processor cycles since all threads turned off execution tracing.

34. The computer usable medium of claim 31, further comprising computer readable program code means for recording said common predetermined event in a plurality of data packets.

35. The computer usable medium of claim 31, further comprising computer readable program code means for reconstructing interrelated execution tracing information for threads operating in said multi-threaded processor using a plurality of data packets associated with said common predetermined event.

\* \* \* \* \*